US012343741B2

(12) United States Patent
Park et al.

(10) Patent No.: US 12,343,741 B2
(45) Date of Patent: Jul. 1, 2025

(54) METHODS AND SYSTEMS FOR COLLECTING PARTICLES AND GASEOUS CHEMICALS

(71) Applicant: Environmental Monitoring Technologies, LLC, Cincinnati, OH (US)

(72) Inventors: Youngji Park, Cincinnati, OH (US); Sang Young Son, Cincinnati, OH (US)

(73) Assignee: Environmental Monitoring Technologies, LLC, Cincinnati, OH (US)

( * ) Notice: Subject to any disclaimer, the term of this patent is extended or adjusted under 35 U.S.C. 154(b) by 655 days.

(21) Appl. No.: 17/682,440

(22) Filed: Feb. 28, 2022

(65) Prior Publication Data

US 2022/0176304 A1    Jun. 9, 2022

Related U.S. Application Data

(63) Continuation of application No. PCT/US2020/034614, filed on May 27, 2020, which
(Continued)

(51) Int. Cl.
*B05B 1/24*        (2006.01)
*B01D 45/02*    (2006.01)
(Continued)

(52) U.S. Cl.
CPC ............... *B05B 1/24* (2013.01); *B01D 45/02* (2013.01); *B01D 45/08* (2013.01); *B01D 47/05* (2013.01);
(Continued)

(58) Field of Classification Search
None
See application file for complete search history.

(56) References Cited

U.S. PATENT DOCUMENTS

2003/0082825 A1\*  5/2003  Lee ..................... G01N 15/065
                                                                                422/68.1
2010/0180765 A1    7/2010  Son et al.
(Continued)

FOREIGN PATENT DOCUMENTS

KR    1020150049247       \*  5/2015    ........... G01N 1/2208
KR    1020150049247 A        5/2015

OTHER PUBLICATIONS

English language machine translation for KR 1020150049247. Retrieved from translationportal.epo.org on Oct. 7, 2024. (Year: 2024).\*
(Continued)

*Primary Examiner* — Jason M Greene
(74) *Attorney, Agent, or Firm* — Dinsmore & Shohl LLP; Yongsok Choi, Esq.

(57) ABSTRACT

A method for collecting particles or gaseous chemicals is provided. The method includes providing liquid to a tube of a droplet generator, heating, with a heater of the droplet generator, the tube to provide vapor to a gas flow channel inside the tube, passing a gas flow containing the particles or gaseous chemicals through the gas flow channel inside the tube to obtain droplets including the particles or gaseous chemicals, and passing the droplets including the particles or gaseous chemicals to a wall of a collecting device such that the droplets including the particles or gaseous chemicals hit the wall. The temperature inside the gas flow channel is higher than a temperature inside the collecting device.

19 Claims, 22 Drawing Sheets

Related U.S. Application Data is a continuation of application No. PCT/US2019/049320, filed on Sep. 3, 2019.

(51) Int. Cl.
| | |
|---|---|
| *B01D 45/08* | (2006.01) |
| *B01D 47/05* | (2006.01) |
| *B01D 53/78* | (2006.01) |
| *B05B 1/02* | (2006.01) |
| *G01N 1/22* | (2006.01) |
| *G01N 15/06* | (2024.01) |

(52) U.S. Cl.
CPC ............... *B01D 53/78* (2013.01); *B05B 1/02* (2013.01); *G01N 1/2208* (2013.01); *G01N 15/06* (2013.01); *G01N 2001/2217* (2013.01); *G01N 1/2273* (2013.01); *G01N 15/065* (2013.01)

(56) References Cited

U.S. PATENT DOCUMENTS

| | | |
|---|---|---|
| 2014/0134623 A1 | 5/2014 | Hiddessen et al. |
| 2017/0157583 A1* | 6/2017 | Kulkarni .............. G01N 15/065 |
| 2018/0290154 A1 | 10/2018 | Baxter |
| 2019/0015771 A1 | 1/2019 | Son |

OTHER PUBLICATIONS

International Search Report of PCT/US20/34614 dated Oct. 14, 2020.

\* cited by examiner

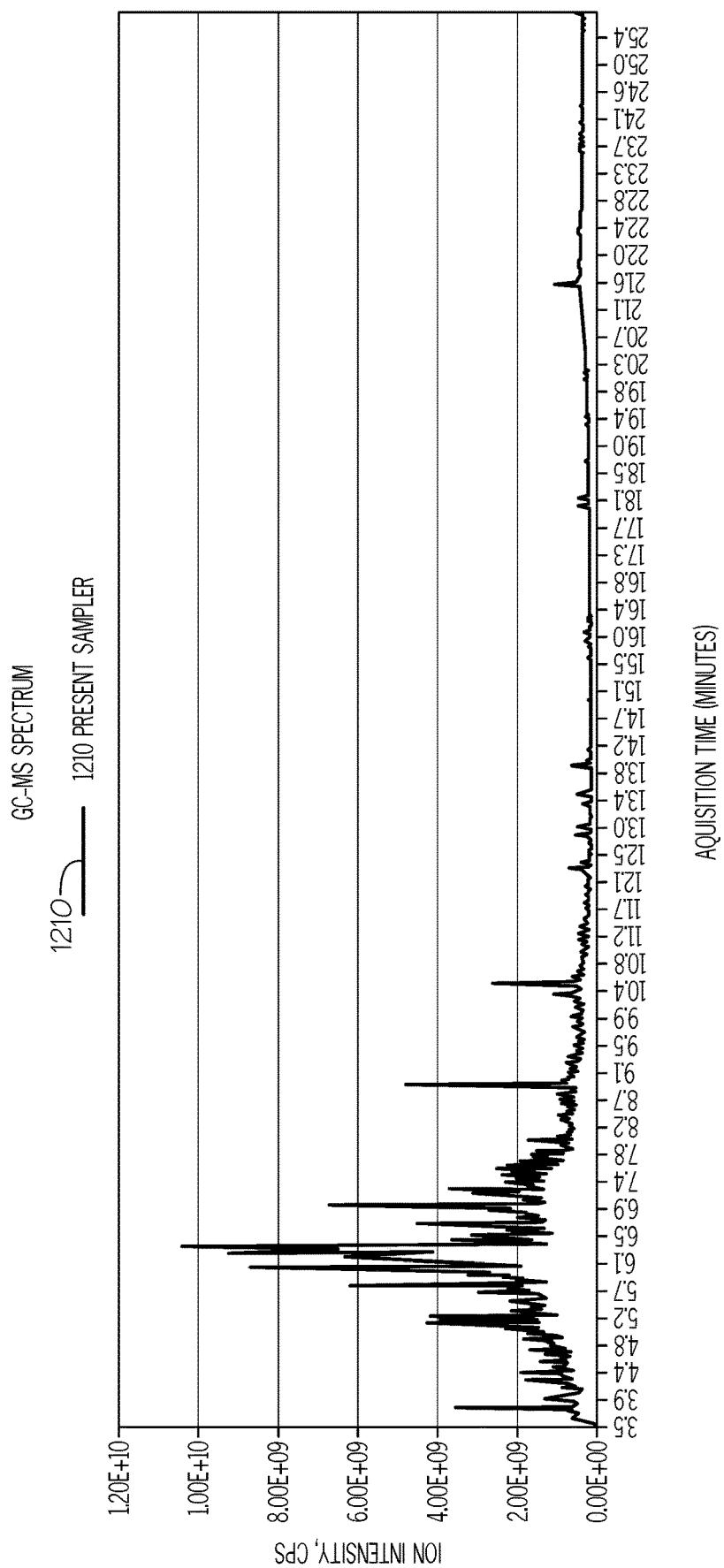
FIG. 12A1

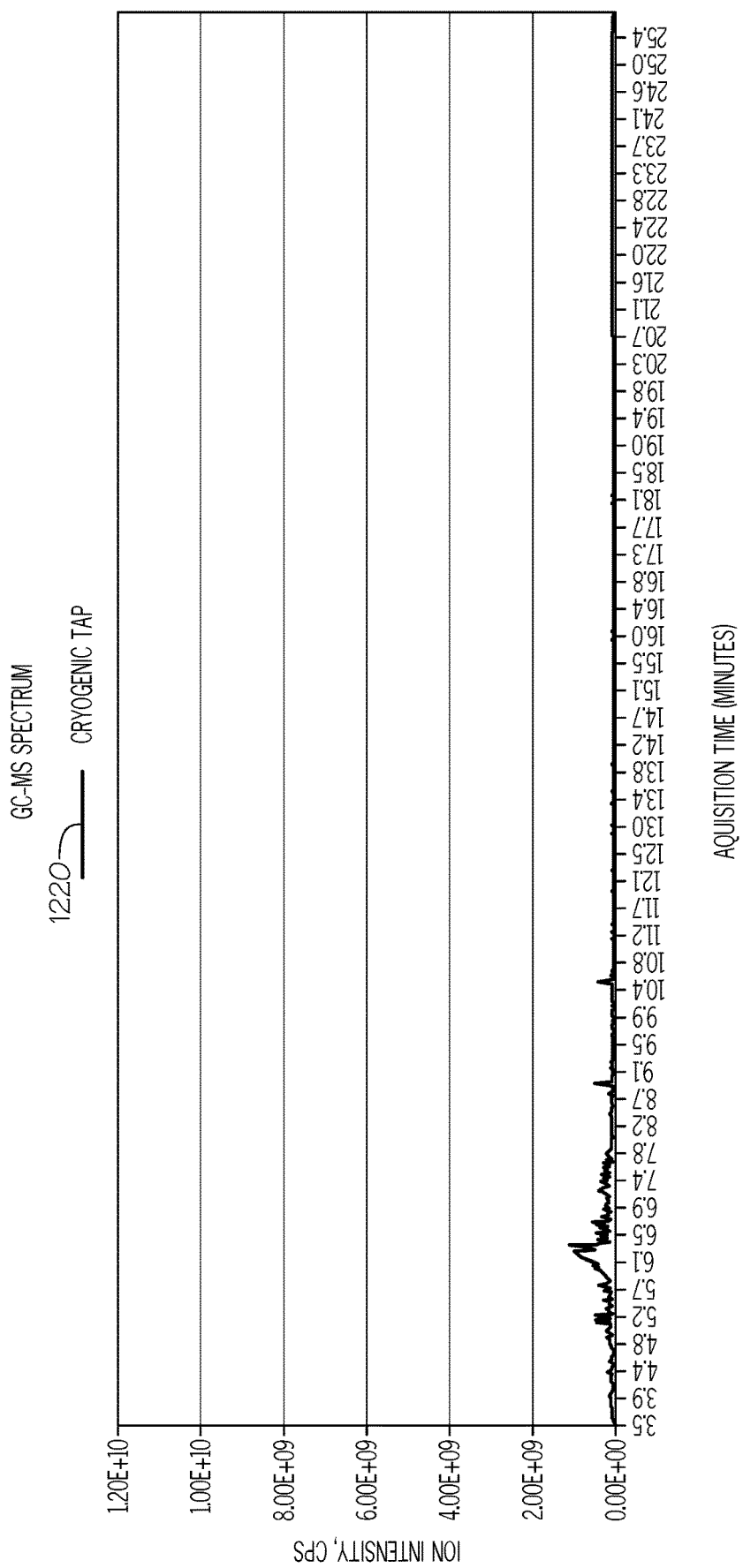
FIG. 12A2

METHODS AND SYSTEMS FOR COLLECTING PARTICLES AND GASEOUS CHEMICALS

CROSS-REFERENCE TO RELATED APPLICATIONS

This application is a continuation of International Application No. PCT/US2020/034614 filed on May 27, 2020, which claims priority to International Application No. PCT/US2019/049320, filed on Sep. 3, 2019, the entire contents of which are herein incorporated by reference.

TECHNICAL FIELD

The present invention generally relates to methods and systems for collecting particles and gaseous chemicals and, more particularly, to collecting particles and gaseous chemicals using droplet generators that grow droplets.

BACKGROUND

People are exposed to varying levels of volatile organic compounds, airborne pollutants, virus and bacteria, liquid droplets, and organic/inorganic particulates. Conventional particle collection technologies including cyclone, wet cyclone, impactor, and liquid impinger utilize the inertia of particle induced by particle mass and air velocity. Particles of high inertia cannot maintain their trajectory as they accelerate along with the air flow and impact on the wall of the cyclone separating from air stream. This characteristic of particle separation from air is due to momentum (inertia), which is a function of the mass of the particle and velocity of air flow. Collection efficiency (or collection power) of cyclone is proportional to the magnitude of the particle mass and air velocity.

Separating small particles from air stream requires the particle velocity in a conventional cyclone to be sufficiently high such that particles of low mass collide on the walls. For example, a cyclone may collect one-micrometer (1,000 nanometer) particle with 100% collection efficiency at air velocity of 1 m/s. In order to collect 10 nanometer (1/100 of 1,000 nanometer) particle with the same collection efficiency, the cyclone needs to increase the air velocity one-million times faster from 1 m/s to 1,000,000 m/s because the mass of 10-nanometer particle is one-million times lighter than 1-micrometer particle. However, the required high velocity of 1,000,000 m/s is non-feasible in engineering systems.

Therefore, a need exists for a particle collector that may collect ultrafine particles without significantly increasing the velocity of the particles.

SUMMARY

In one embodiment, a method for collecting particles or gaseous chemicals is provided. The method includes providing liquid to a tube of a droplet generator, heating, with a heater of the droplet generator, the tube to provide vapor to a gas flow channel inside the tube, passing a gas flow containing the particles or gaseous chemicals through the gas flow channel inside the tube to obtain droplets including the particles or gaseous chemicals, and passing the droplets including the particles or gaseous chemicals to a wall of a collecting device such that the droplets including the particles or gaseous chemicals hit the wall. The temperature inside the gas flow channel is higher than a temperature inside the collecting device.

In another embodiment, a system for collecting particles or gaseous chemicals is provided. The system includes a pump, and a droplet generator including a chamber, a tube containing liquid and extending through the chamber, a gas flow channel inside the tube, and a heater configured to heat the liquid contained in the tube to provide vapor to a gas flow channel inside the tube. The system also includes a collecting device comprising a wall. The pump is configured to: pass a gas flow containing particles or gaseous chemicals through the gas flow channel inside the tube to obtain droplets including the particles or gaseous chemicals, and pass the droplets including the particles or gaseous chemicals to the wall of the collecting device such that the generated droplets including the particles or gaseous chemicals hit the wall.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

FIG. 12A1 depicts a Gas chromatography-mass spectrometry (GC-MS) spectrum illustrating ion intensity in counts per second (CPS) over time in minutes for particles collected by the present sampler;

FIG. 12A2 depicts a GC-MS spectrum illustrating ion intensity in CPS over time in minutes for particles collected by a conventional cryogenic trap.

DETAILED DESCRIPTION

Figure 1:
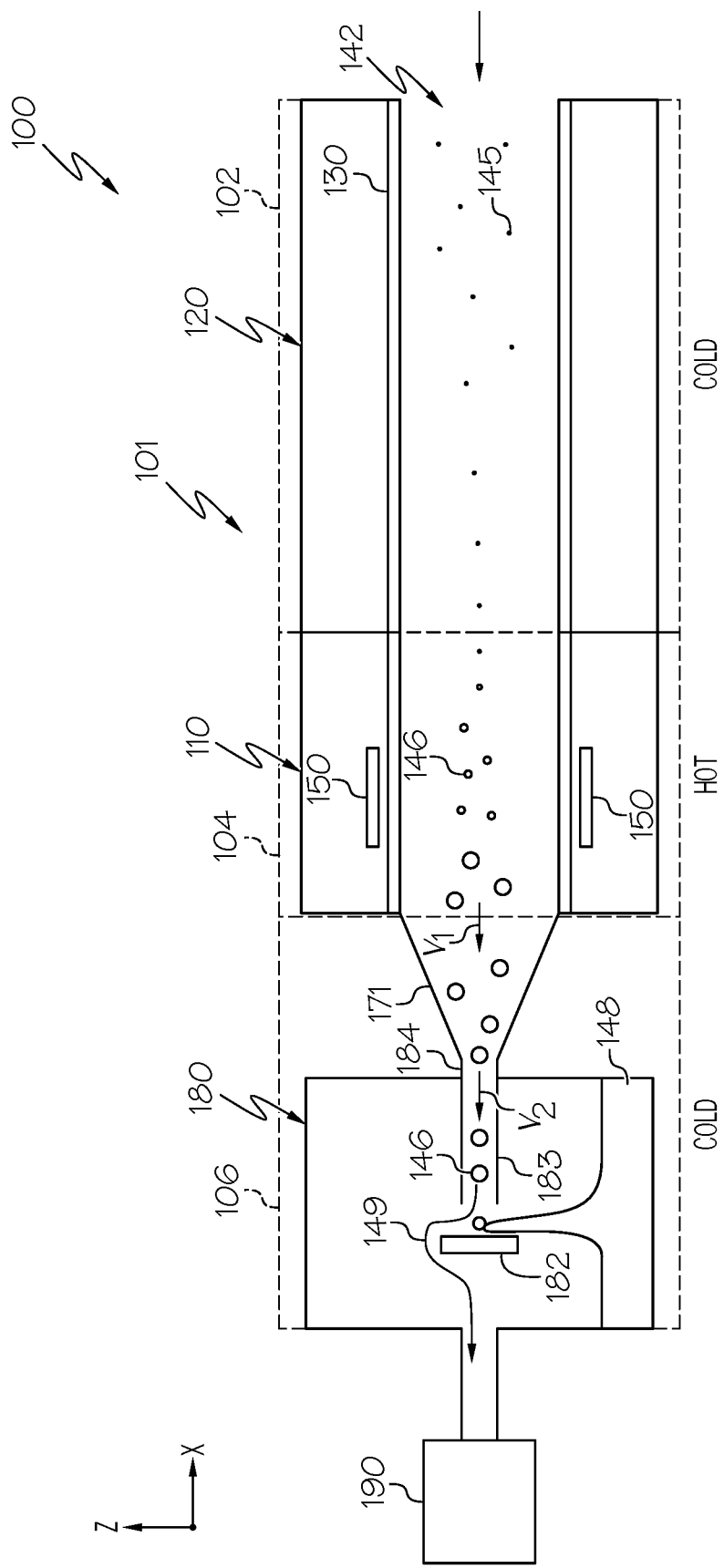
FIG. 1 depicts a system for collecting particles and/or gaseous chemicals, according to one or more embodiments shown and described herein.

Reference will now be made in detail to aspects of various embodiment of the present disclosure, examples of which are illustrated in the accompanying drawings, wherein like reference numerals refer to the like elements throughout.

The embodiments described herein generally relate to collecting particles and/or gaseous chemicals using droplet generators. More particularly, embodiments described herein are directed to methods and systems for collecting particles and/or gaseous chemicals by droplets which grow in a super-saturation condition, and further grow in a cooing condition. The method includes providing liquid to a tube of the droplet generator, heating, with a heater of the droplet generator, the tube to provide vapor to a gas flow channel inside the tube, passing a gas flow containing the particles or gaseous chemicals through the gas flow channel inside the tube to obtain droplets including the particles or gaseous chemicals, and passing the droplets including the particles or gaseous chemicals to a wall of a collecting device such that the droplets including the particles or gaseous chemicals hit the wall. A temperature inside the gas flow channel is higher than a temperature inside the collecting device. The gas flow containing the particles or gaseous chemicals is passed through the gas flow channel inside the tube by a pump, and the droplets including the particles or gaseous chemicals is passed to a wall of a collecting device by the pump. The droplets hit the wall because of inertia and accumulate in the collecting device.

The methods and systems for collecting particles and gaseous chemicals will be described in more detail herein.

FIG. 1 depicts a system 100 for collecting particles and/or gaseous chemicals, according to one or more embodiments shown and described herein. Particles may include any number of various particles including, but not limited to, diesel particles, microbes, chemical compounds, and the like in the air. The gaseous chemicals may include any number of various gaseous chemicals including, but not limited to, volatile organic compounds (VOCs), inorganic or organic chemicals, virus, bacteria, and the like in the air.

The system 100 may include three zones including a zone 102, a zone 104, and a zone 106. The zone 102 and the zone 106 are cold zones and the zone 104 is a hot zone. The temperature of gas within a chamber 120 in the zone 102 is lower than the temperature of gas within a chamber 110 in the zone 104, and the temperature of gas within a nozzle and a collecting device 180 in the zone 106 is lower than the temperature of gas within the chamber 110 in the zone 104. The temperature difference is mainly caused by a heater 150 in zone 2. Cooling devices (not shown in FIG. 1) may be installed in the zone 102 and/or the zone 106 in order to increase temperature differences among the zones 102, 104, and 106. In some embodiments, the system 100 may include two zones including the zone 104 and the zone 106 without the zone 102.

The zone 104 includes the chamber 110 and the zone 102 includes the chamber 120. As shown in FIG. 1, a tube 130 extends through the chamber 110 and the chamber 120 along the x-axis. A gas flow channel 142 is present within the tube 130. A heater 150 is within the chamber 110. The chamber 110, the chamber 120, the tube 130, and the heater 150 in combined constitute a droplet generator 101. The details of the droplet generator 101 including the chamber 110, the chamber 120, the tube 130, and the heater 150 will be described below with reference FIGS. 1A, 2A, and 2B.

The zone 106 includes the collecting device 180. A nozzle 171 may be connected between the outlet of the chamber 110 and the inlet of the collecting device 180. The nozzle 171 increases the velocity of the droplets 146. For example, the velocity of droplets 146 at the entrance of the nozzle 171 may be $v_1$ and the velocity of droplets 146 at the exit of the nozzle 171 may be $v_2$ that is greater than $v_2$. The $v_2$ may be determined based on the diameter of the outlet of the nozzle 171. If the diameter of the outlet of the nozzle 171 is 2 millimeters, $v_2$ at the outlet of the nozzle may be about 2.65 meter/second. If the diameter of the outlet of the nozzle 171 is 1 millimeter, $v_2$ at the outlet of the nozzle may be about 10.6 meter/second. If the diameter of the outlet of the nozzle 171 is 0.5 millimeters, $v_2$ at the outlet of the nozzle may be about 42.4 meter/second. If the diameter of the outlet of the nozzle 171 is 0.3 millimeters, $v_2$ at the outlet of the nozzle may be about 117.9 meter/second. In some embodiments, the system 100 may not include the nozzle 171, and the outlet of the chamber 110 may be connected to the inlet of the collecting device 180 via a tube.

The collecting device 180 may include a wall 182 inside the collecting device 180. A tube 183 inside the collecting device 180 is directed to the wall 182. The end of the tube 183 is spaced apart from the wall 182 such that the gas output from the tube 183 may flow around the wall 182 as indicated as an arrow 149 and droplets 146 output from the tube 183 hit wall 182. The droplets 146 hit the wall because of their inertia. The droplets 146 hitting the wall may condense and flow down due to gravity and be collected at the bottom of the collecting device 180 as liquid 148 as shown in FIG. 1. The liquid 148 may contain particles and/or gaseous chemicals that were present in the gas flowing into the gas flow channel 142.

In embodiments, a pump 190 is connected to the outlet of the collecting device 180. The pump 190 allows gas to flow through the gas flow channel 142, the nozzle 171, and the collecting device 180. The flow rate inside the gas flow channel 142 may be, for example, about 8.33 $cm^3$/second. The gas flowing into the gas flow channel 142 may include particles 145 and other gaseous chemicals (not shown in FIG. 1). The chamber 110 may provide vapor into the gas flow channel 142 using the heater 150 and increase the humidity within the gas flow channel 142 such that the gas flow channel 142 in the zone 104 becomes in a super-saturated condition, thereby causing growth of the particles by condensation. For example, as shown in FIG. 1, condensed droplets 146 are formed upon the particles 145. As the droplets 146 pass the gas flow channel 142 in the zone 104, the droplets 146 become larger due to the super-saturated condition. For example, the size of the particle 145 may be an order of nanometer (e.g., 5 nanometers), and the droplet 146 may grow up to the size of several micrometers (e.g., a diameter of 2-5 micrometers). Compared to the nanometer sized particles, the micrometer sized droplets are easily collectable, detectable, visible, and countable by the collecting device 180.

The momentum (inertia), of the droplets 146 increases rapidly in proportion to mass increase. For example, at 0.3 meter/second air velocity in the gas flow channel 142, an ultrafine particle 145 (e.g., a 10 nanometer particle) may grow to a 3-micrometer droplet 146 in less than 0.3 seconds. The original momentum (inertia) of the 10 nanometer particle increases 2.7 million times in 0.3 seconds during passage through the gas flow channel 142 according to Equation 1.

$$\text{Momentum of particle(Inertia)} = \text{particle mass} \times \text{air velocity} \quad \text{Equation(1)}$$

Particle collection efficiency or particle collection power of the system 100 is proportional to the momentum of particle (inertia). Thus, the particle collection power may increase by 2.7 million times without increasing air velocity. In contrast, the conventional cyclone should increase air velocity from 0.3 m/s to 810,000 m/s in order to have the equivalent collection power to the present system. That is, the present system 100 increases the momentum of particles by increasing the sizes of the droplets 146 including the particles whereas conventional cyclone does not increase the mass of particles.

The collected droplets containing particles and/or gaseous chemicals by the collecting device 180 are stored at the bottom of the collecting device 180 as liquid 148 in FIG. 1. The concentration of particles is proportional to the number of particles-per-water volume. The necessary water volume for collecting the particles is extremely small to contain a particle. For example, as described above, the necessary water volume is $1.4 \times 10^{-8}$ microliter for a 10-nanometer particle to grow to a 3-micrometer droplet in the zone 104. Assuming that the system intakes the air with the volume flow rate of 1,000 $m^3$/hour and the particle concentration in the air is $1.0 \times 10^9$ particles/$m^3$ for 24 hours, the total number of particles collected by the system 100 is $2.4 \times 10^{13}$. All particles collected in 24 hours may be contained in only 100 milliliter of water in the collecting device 180. Therefore, the particles in the air are concentrated $2.4 \times 10^8$ times in water in the collecting device 180. Because the present system 100 has very high concentration power, the system 100 collects particles in a very efficient manner that exist only at a very low concentration in the air.

Figure 1A:
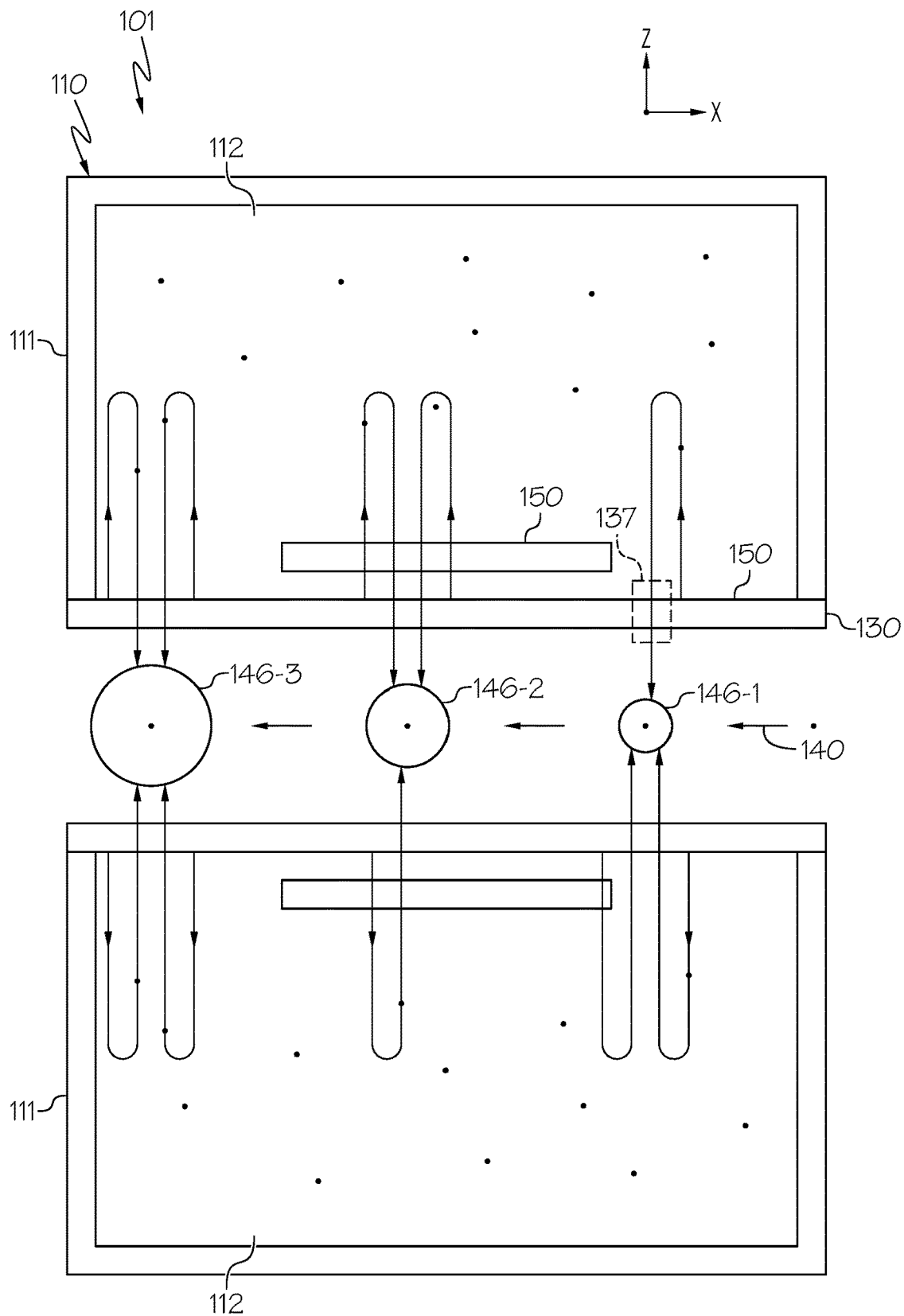
FIG. 1A depicts a cross sectional view of a droplet generator, according to one or more embodiments shown and described herein.

FIG. 1A depicts a cross sectional view of a droplet generator, according to one or more embodiments shown and described herein.

As illustrated in FIG. 1A, a chamber 110 includes an enclosed space 112 bounded by the housing 111 and a tube 130. Specifically, the enclosed space 112 is bounded by the housing 111 and the outer surface 132 of the tube 130. That is, the portion of the chamber 110 is excluded by the tube 130 that passes through the chamber 110. While FIG. 1A depicts the enclosed space 112 as a rectangular shape, the shape of the enclosed space 112 is not limited thereto. In embodiments, the central axis of the chamber 110 may be parallel with the central axis of the tube 130. For example, the central axis of the chamber 110 may overlap with the central axis of the tube 130. As another example, the central axis of the tube 130 may be deviated from the central axis of the chamber 110, however the central axis of the chamber 110 may be parallel with the central axis of the tube 130. The enclosed space 112 is filled with gas having vapor. The vapor may be water vapor, or vapor of any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The gas in the enclosed space 112 may include non-condensable gas, such as gas previously dissolved in liquid.

The tube 130 has various functions. First, the tube 130 functions as a liquid flow channel that allows liquid from an external liquid supplier to move in $-x$ direction via the sidewall 136 by capillary action. Second, the tube 130 provides vapor into the chamber 110 when heated by the heater 150. For example, the liquid in the tube vaporize into the chamber 110 when heated by the heater 150. Third, the tube 130 includes a plurality of pores that allow the vapor in the first chamber 110 to pass through the pores and flow into the gas flow channel 142. For example, the tube 130 may be made of hydrophilic polymer having a pore structure, which will be described in detail with reference to FIGS. 1B and 1C.

As described in more detail below, the liquid in the sidewall 136 at the chamber 110 may be phase-changed into vapor by the heater 150. The liquid may be water, any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The heater 150 may be installed at any location in the chamber 110. For example, the heater 150 may be installed at the outer surface 132 of the tube 130. As another example, the heater 150 may be installed over the outer surface 132 of the tube 130. The vapor flows into the enclosed space 112 of the chamber 110. The vapor in the chamber 110 is then delivered toward the gas flow channel 142 via the pores of the tube 130.

Figure 1B:
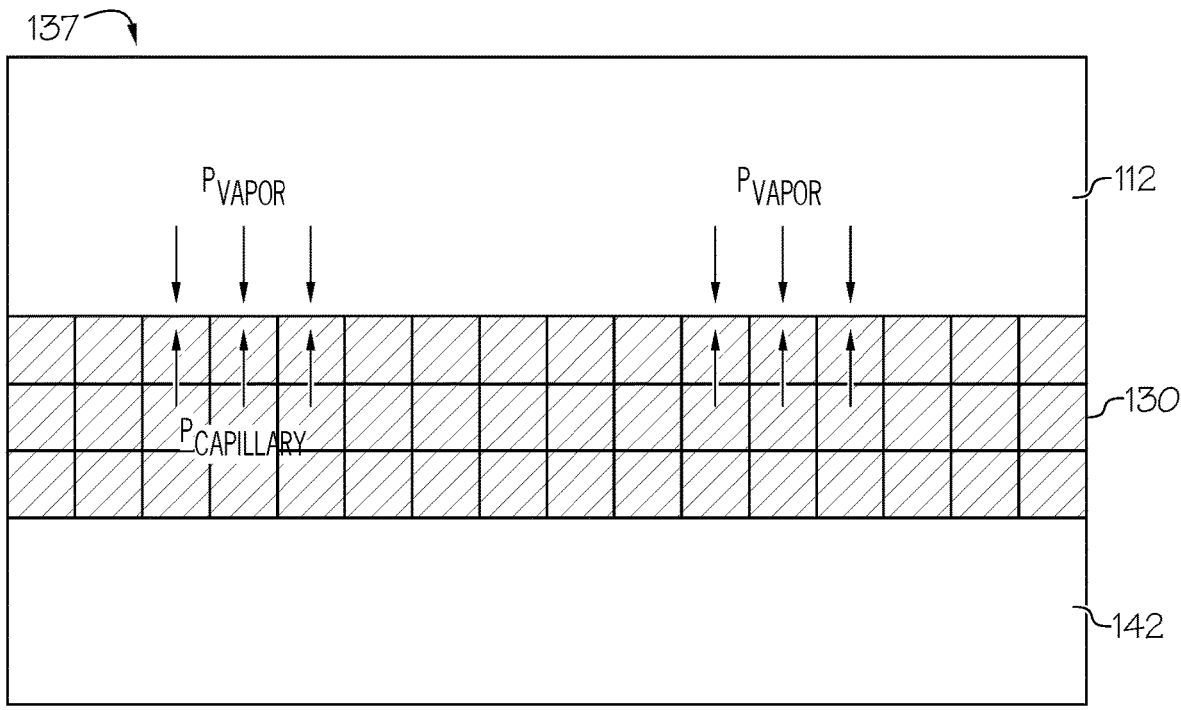
FIG. 1B depicts an enlarged view of a portion of a tube, according to one or more embodiments shown and described herein.
Figure 1C:
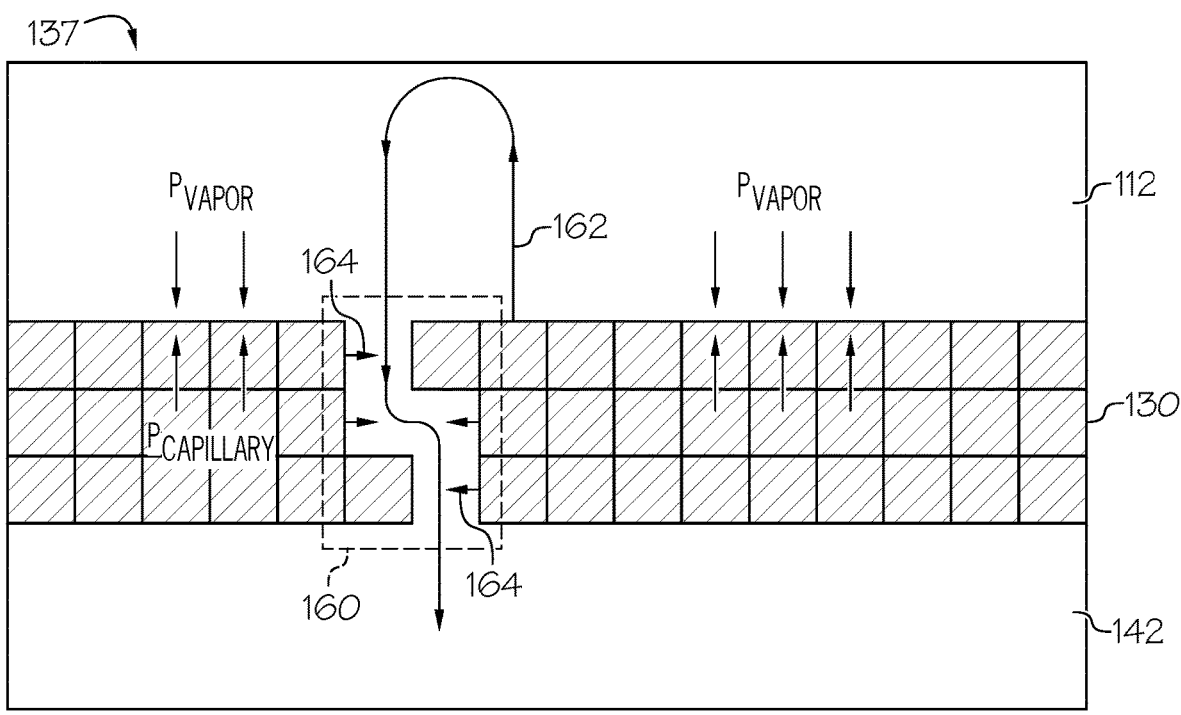
FIG. 1C depicts an enlarged view of a portion of a tube, according to one or more embodiments shown and described herein.

FIGS. 1B and 1C depict an enlarged view of the area 137 including a portion of the tube 130. The tube 130 may be made of hydrophilic polymer. For example, the tube 130 may be made of filter paper. The tube 130 may include cellulose fibers. The tube 130 includes porous structure having a plurality of pores. Liquid contained in the tube 130 fills the pores of the tube 130 as indicated as diagonal lines in FIG. 1B. It should be understood that the pores and overall pore structure of the tube 130 depicted in FIGS. 1B and 1C are for illustrative purposes only, as the pores may travel in any direction and have different sizes.

When the outer surface of the tube 130 is heated by the heater 150 (not shown in FIGS. 1B and 1C), the liquid contained in the tube 130 evaporates into the chamber 110 as indicated by arrows in FIG. 1A. When the temperature of the outer surface of the tube 130 is higher than the temperature of the inner surface of the tube 130, the evaporation of liquid starts at the outer surface of the tube 130. The generated vapor by evaporation may be accumulated in the enclosed space 112 of the chamber 110 as long as vapor pressure is also increased.

When the vapor pressure ($P_{vapor}$) in the enclosed space 112 is smaller than the capillary pressure ($P_{capillary}$) in the tube 130, the vapor in the enclosed space 112 may be blocked by the liquid in the tube 130 and may not pass through the tube 130. Specifically, by referring to FIG. 1B, the vapor pressure ($P_{vapor}$) in the enclosed space 112 is smaller than the capillary pressure ($P_{capillary}$) in the tube 130. The capillary pressure ($P_{capillary}$) is determined by the pore size of porous structure, surface tension of the liquid in the tube 130, and a contact angle between the liquid and the pore structure. The capillary pressure can be estimated by Young-Laplace equation:

$$P_{capillary} = \sigma \cdot \cos\theta / d \qquad \text{Equation (2)}$$

where $P_{capillary}$ is the capillary pressure, σ is the surface tension of liquid 122, θ is the contact angle between liquid and pore structure, and d is the pore size. The vapor pressure ($P_{vapor}$) in the enclosed space 112 continues to increase as vapor is continuously introduced to the enclosed space 112 by the heater 150.

When the vapor pressure ($P_{vapor}$) reaches a certain level that is higher than the capillary pressure ($P_{capillary}$), the vapor pressure starts making one or more paths through the pore structure of the sidewall of the tube 130. By referring to FIG. 1C, for example, a path 160 is created in the pore structure of the sidewall of the tube 130. The shape and size of the path 160 may be randomly determined depending on dynamics of the vapor pressure ($P_{vapor}$) and the capillary pressure ($P_{capillary}$). The path 160 allows the vapor in the enclosed space 112 to pass through the tube 130 due the pressure difference in the pressure in the enclosed space 112 and the pressure in the gas flow channel 142. That is, the pressure in the enclosed space 112 is greater than the pressure in the gas flow channel 142 such that the vapor in the enclosed space 112 flows into the gas flow channel 142 as indicated by an arrow 162. Liquid in the tube 130 may vaporize along the path 160 as indicated by the arrows 164 such that vapor is supplied to the path 160, and flows into the gas flow channel 142.

The flow of vapor from the chamber 110 into the gas flow channel 142 increases the humidity within the gas flow channel 142 and makes the gas flow channel 142 in a super-saturated condition, thereby causing growth of the particles by condensation. For example, as shown in FIG. 1A, condensed droplets 146-1, 146-2, and 146-3 are formed upon the particles. The temperature of vapor in the chamber 110 is higher than the temperature of the gas including particles in the gas flow channel 142. Thus, the vapor from the chamber 110 may easily condense upon particles and droplets including particles.

Referring to FIG. 1A, the tube 130 is configured to induce the particle-containing gas flow 140 into the gas flow channel 142 inside the tube 130. The particle-containing gas flow 140 may include any number of various particles including, but not limited to, diesel particles, microbes, chemical compounds, etc. The particle-containing gas flow 140 may also include volatile organic compounds, chemical gas, virus and bacteria, etc. The carrier of the particle-containing gas flow 140 may be a gas such as oxygen or nitrogen, for example. The particle-containing gas flow 140 may be continuously drawn into the first opening 133 by any means. As an example and not a limitation, the pump 190 in FIG. 1 may be utilized to draw particle-containing air into the tube 130. As the particle-containing gas flow 140 traverses the gas flow channel 142 in −x direction, condensed droplets are formed upon the particles, for example, droplets 146-1, 146-2, and 146-3 which then exit the gas flow channel 142 on a continuous basis. The particles may be nanoscale particles and serve as seeds to become water droplets. The condensed droplets become bigger and gain weight as they move through the gas flow channel 142 because more vapor comes in contact with and condenses on the droplets as the droplets travel within a super-saturated area. In this regard, a nanoscale particle grows to microscale water droplet.

By growing the volume (i.e., mass) of droplets (e.g., 146-1, 146-2, 146-3), the inertia of droplets also increases rapidly in proportion to volume increase. For example, the droplet generator 101 grows a particle (e.g., a 10-nm particle) to a 3-micron water droplet in less than 0.3 seconds. The original inertia of the particle increases 2.7 million times in 0.3 seconds during passage through the droplet generator 101.

FIG. 1D depicts a collecting device according to one or more embodiments shown and described herein. The collecting device 180 may be a container having an inlet 189 and an outlet 185. The collecting device 180 may be cylindrical chamber having a sidewall 181. However, the shape of the collecting device 180 is not limited thereto, and may be any different shape. The outlet 185 may be connected to the pump 190 in FIG. 1 via a tube 191. The inlet 189 is configured to receive a tube 184 extended from the nozzle 171. The exit of the nozzle 171 is connected to the tube 184 which is connected to the collecting device 180.

In this embodiment, the end of the tube 184 is spaced apart from the inner surface of the sidewall 181 such that gas output from the tube 184 may flow along the sidewall 181 as indicated as an arrow 147 and droplets 146 output from the tube 184 hit the inner surface of the sidewall 181. The droplets 146 hitting the sidewall 181 may condense and flow down due to gravity and be collected at the bottom of the collecting device 180 as liquid 148 as shown in FIG. 1D. In some embodiments, a separate wall similar to the wall 182 in FIG. 1 may be installed within the collecting device. The separate wall may be positioned proximate to the end of the tube 184 such that the droplets 146 output from the tube 184 hit the separate wall.

In embodiments, a cooling device 186 may be positioned proximate to the tube 184 and lower the temperature of the gas within the tube 184. The size and location of the cooling device 186 are not limited to the location shown in FIG. 1D. For example, the cooling device may be positioned at a different location, e.g., proximate to the nozzle 171. As another example, the cooling device may cover the most or entire of the tube 184 between the nozzle 171 and the collecting device 180.

When the droplets 146 output from the droplet generator 101 in FIG. 1 pass through the nozzle 171 and the tube 184 in the zone 106, the temperature of the gas around the droplets 146 drops, and the sizes of the droplets 146 increase due to condensation. The cooling device 186 allows the droplets 146 within the nozzle 171 or the tube 184 to further grow while passing through the nozzle 171 and the tube 184 by lowering the temperature of the gas.

Figure 1D:
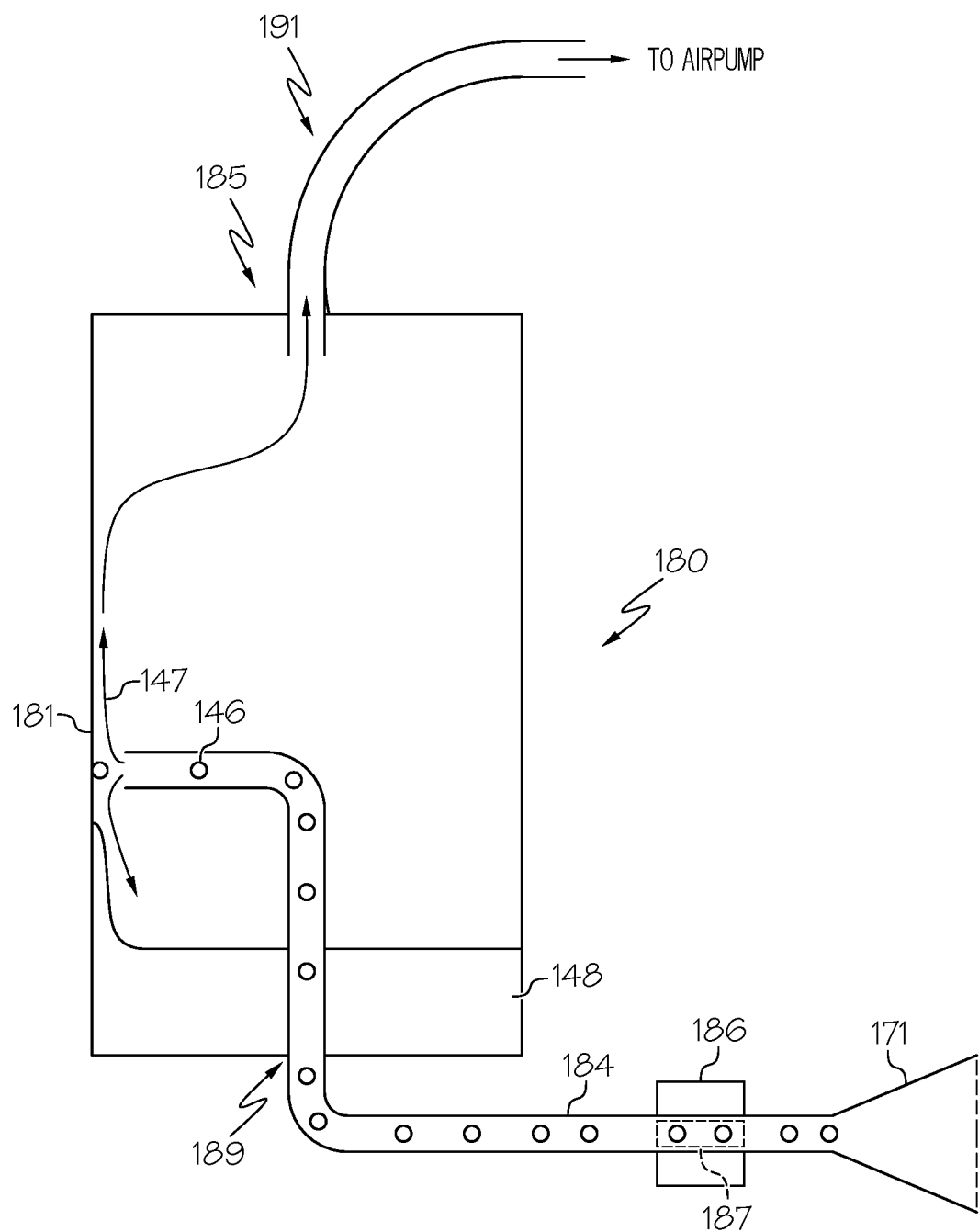
FIG. 1D depicts a collecting device according to one or more embodiments shown and described herein.
Figure 1E:
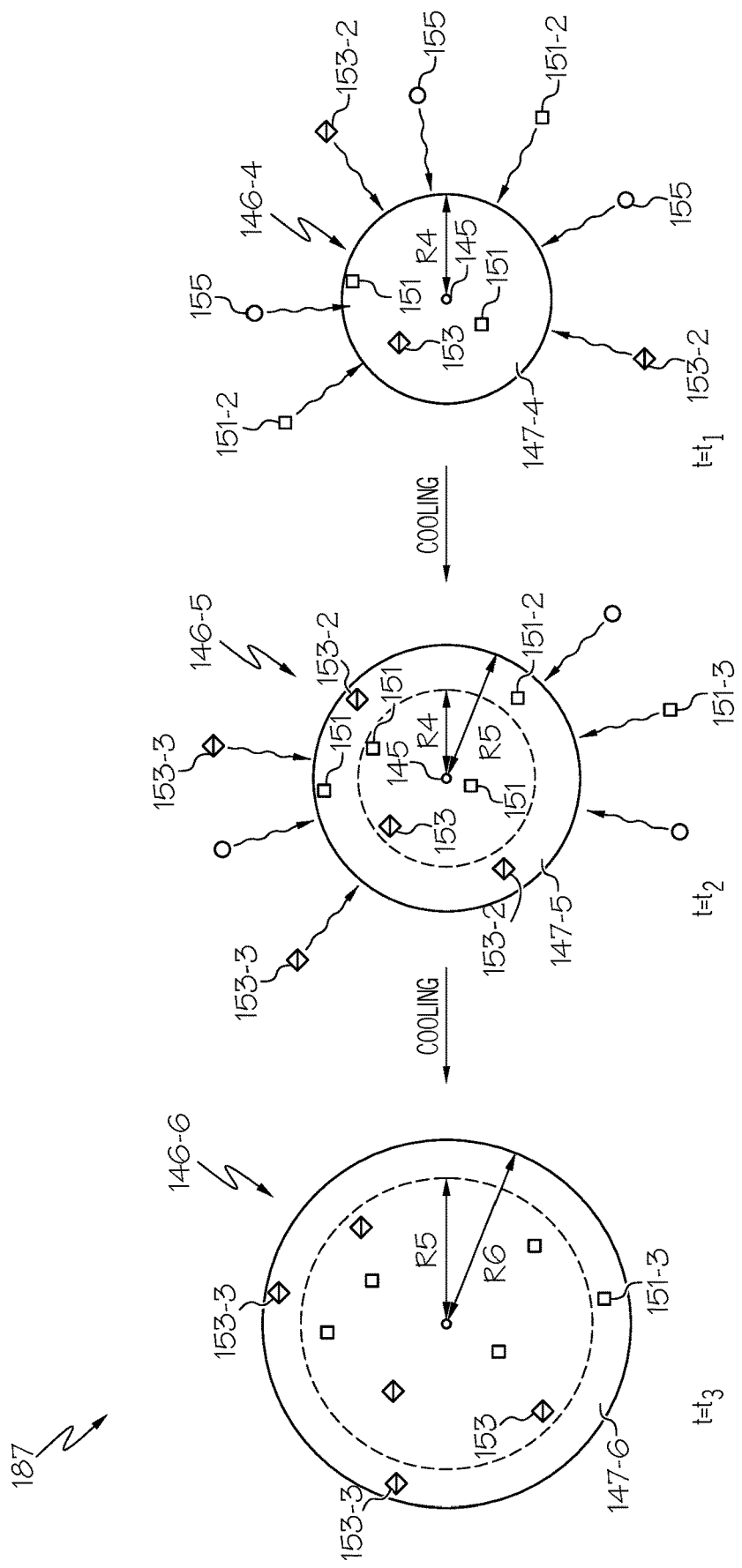
FIG. 1E depicts an enlarged view of the area in FIG. 1D according to one or more embodiments shown and described herein.

FIG. 1E depicts an enlarged view of the area 187 in FIG. 1D according to one or more embodiments shown and described herein. The droplets serve as media to collect VOCs and/or other gaseous chemicals. VOCs and/or gaseous chemical near the surface of the droplet (e.g., 146-4, 146-5, 146-6) spontaneously move to the surface by diffusion from a region of higher chemical concentration (e.g., a region outside the droplets 146-4, 146-5, 146-6) to a region of lower concentration of the surface of the droplets.

Droplets 146 within the area 187 become larger as they pass through the tube 184 due to condensation. For example, at time $t_1$, a droplet 146-4 having a radius of R4 includes a particle 145 and gaseous chemicals including volatile organic chemical (VOC) 151 and VOC 153. The VOC 151 and VOC 153 may be previously diffused into the droplet 146-4 when the droplet 146-4 progressed in the zone 104 in FIG. 1. Vapors 155 within the tube 184 may condense on the surface of the droplet 146-4 due to cooling. At time $t_2$, the droplet 146-4 becomes a larger droplet 146-5 having a radius of R5. Newly condensed vapor makes the concentration of gaseous chemicals within the droplet 146-5 lower. Thus, the droplet 146-5 continuously collects more VOCs and other gaseous chemicals until the concentration is saturated. For example, as shown in FIG. 1E, the droplet 146-5 collected additional VOCs 151-2 and 153-2 which were not collected by the droplet 146-4 due to saturation at time $t_1$. The VOC and/or other gaseous chemicals diffusion to water droplet can be explained by Fick's law below.

$$J_{VOC} = -\text{Area} \cdot C_{total} \cdot D_{VOC} \cdot \frac{dC_{VOC}}{dC_{total}} \quad \text{Equation (3)}$$

where, $J_{VOC}$ is diffusive VOC (and/or gaseous chemical) transfer rate (kmol/second), Area is surface area (m²) of water droplet, $C_{total}$ is total concentration (kmol/m³), $D_{VOC}$ is the diffusivity of VOC (and/or gaseous chemical) in the mixture (m²/second), and $$\frac{dC_{Voc}}{dC_{total}}$$

is the concentration ratio between VOC (and/or gaseous chemicals) and mixture.

Similarly, at time $t_3$, the droplet 146-5 becomes a greater droplet 146-6 having a radius of R6. Newly condensed vapor makes the concentration of gaseous chemicals within droplet 146-6 lower. Thus, the droplet 146-6 can collect more VOCs and other gaseous chemicals until the concentration is saturated. For example, as shown in FIG. 1E, the droplet 146-6 collected additional VOCs 151-3 and 153-3 which were not collected by the droplet 146-5 due to saturation at time $t_2$.

While FIG. 1E depicts the droplets in tube 184, the droplet growing and gaseous chemical collecting mechanism illustrated in FIG. 1E applies to the droplets 146 within the tube 130 in FIG. 1A. For example, the droplet 146-4 in FIG. 1E may correspond to the droplet 146-1 in FIG. 1A, the droplet 146-5 in FIG. 1E may correspond to the droplet 146-2 in FIG. 1A, and the droplet 146-6 in FIG. 1E may correspond to the droplet 146-3 in FIG. 1A. In FIG. 1A, as the droplet 146-1 becomes a larger droplet 146-2, newly condensed vapor makes the concentration of gaseous chemicals within the droplet 146-2 lower. Thus, the droplet 146-2 can collect more VOCs and other gaseous chemicals until the concentration is saturated. Similarly, as the droplet 146-2 becomes a larger droplet 146-3, newly condensed vapor makes the concentration of gaseous chemicals within the droplet 146-3 lower. Thus, the droplet 146-3 can collect more VOCs and other gaseous chemicals until the concentration is saturated.

Referring now to FIG. 2A, the droplet generator 101 according to one embodiment is illustrated. The illustrated embodiment generally comprises a first chamber 110, a second chamber 120, a tube 130, and a heater 150. As shown in FIG. 2A, the tube 130 extends through the first chamber 110 and the second chamber 120 along the x-axis. The tube 130 includes a first opening 133 at a side of the second chamber 120 and a second opening 131 at a side of the first chamber 110. The heater 150 is within the first chamber 110 and surrounds a portion of the outer surface 132 of the tube 130 as shown in FIG. 2B. The first chamber 110 may be connected to the second chamber 120 via a bypass channel 114. In some embodiments, the droplet generator 101 may not include the bypass channel 114.

The second chamber 120 is configured to maintain liquid 122, which may be water, any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The liquid 122 may be absorbed by the tube 130 in the second chamber 120 and the absorbed liquid may move in −x direction by capillary force (i.e., move toward the first chamber 110). The heater 150 in the first chamber 110 changes a phase of the liquid contained in the tube 130 to vapor such that the vapor is provided into the first chamber 110.

FIG. 2B depicts a cross sectional view of the droplet generator 101 in FIG. 1A on the x-z plane. As illustrated in FIGS. 2A and 2B, the first chamber 110 includes an enclosed space 112. The enclosed space 112 is bounded by the first housing 111 and a first portion 130-1 of the tube 130. Specifically, the first chamber 110 is bounded by the first housing 111 and the outer surface 132 of the first portion 130-1 of the tube 130. That is, the portion of the first chamber 110 is excluded by the tube 130 that passes through the first chamber 110. While FIG. 2A depicts the first chamber 110 as a cylindrical chamber, the shape of the first chamber 110 is not limited thereto, and the first chamber 110 may have different shapes. In embodiments, the central axis of the first chamber 110 may be parallel with the central axis of the tube 130. For example, the central axis of the first chamber 110 may overlap with the central axis of the tube 130. As another example, the central axis of the tube 130 may be deviated from the central axis of the first chamber 110, however the central axis of the first chamber 110 may be parallel with the central axis of the tube 130.

As illustrated in FIGS. 2A and 2B, the second chamber 120 is bounded by the second housing 121 and a second portion 130-2 of the tube 130. Specifically, the second chamber 120 is bounded by the second housing 121 and the outer surface 132 of the second portion 130-2 of the tube 130. That is, the portion of the second chamber 120 is excluded by the tube 130 that passes through the second chamber 120. While FIG. 2A depicts the second chamber 120 as a cylindrical chamber, the shape of the second chamber 120 is not limited thereto, and the second chamber 120 may have different shapes. In embodiments, the central axis of the second chamber 120 is parallel with the central axis of the tube 130. For example, the central axis of the second chamber 120 may overlap with the central axis of the tube 130. As another example, the central axis of the tube 130 may be deviated from the central axis of the second chamber 120, however the central axis of the second chamber 120 may be parallel with the central axis of the tube 130.

As described above with reference to FIG. 2A, the second chamber 120 is configured to maintain liquid 122. The first chamber 110 and the second chamber 120 are separated from each other such that the liquid 122 in the second chamber 120 does not flow into the first chamber 110 except via the tube 130. The second housing 121 may include a liquid inlet (not shown) to fill the second chamber 120 with the liquid 122. In embodiments, the second chamber 120 may be fully filled with the liquid 122, or partially filled with the liquid 122.

Figure 2A:
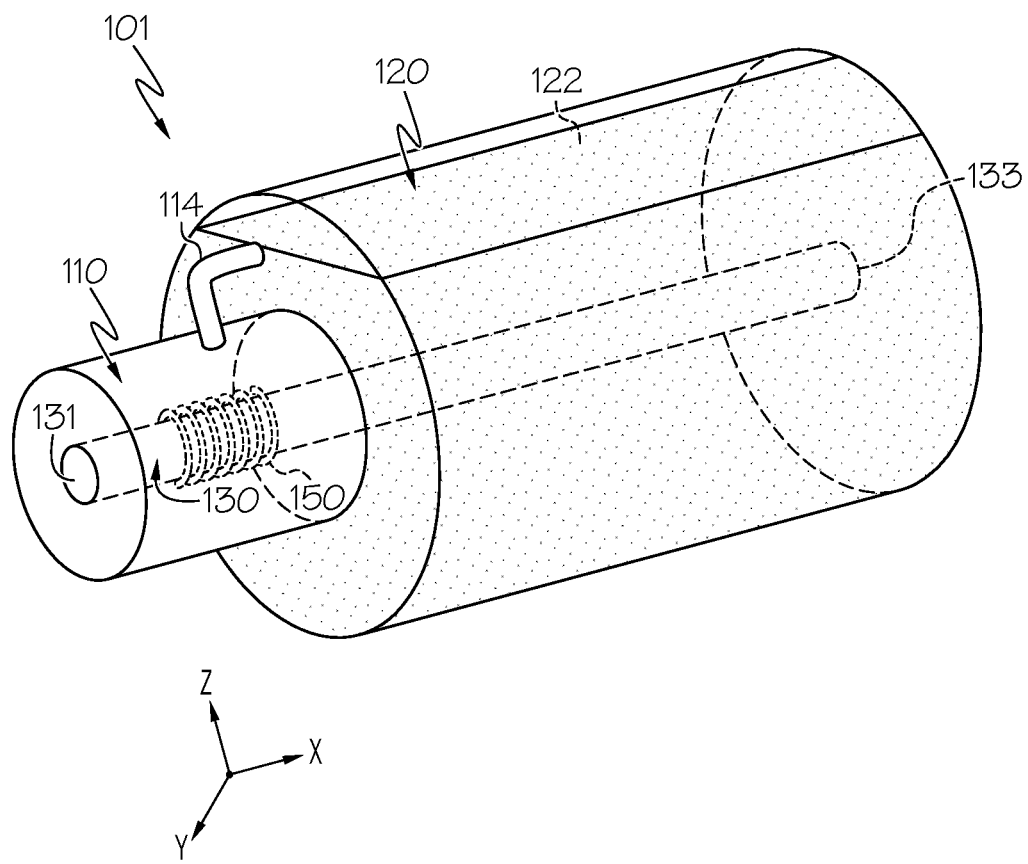
FIG. 2A depicts a schematic of a droplet generator according to one or more embodiments illustrated and described herein.
Figure 2B:
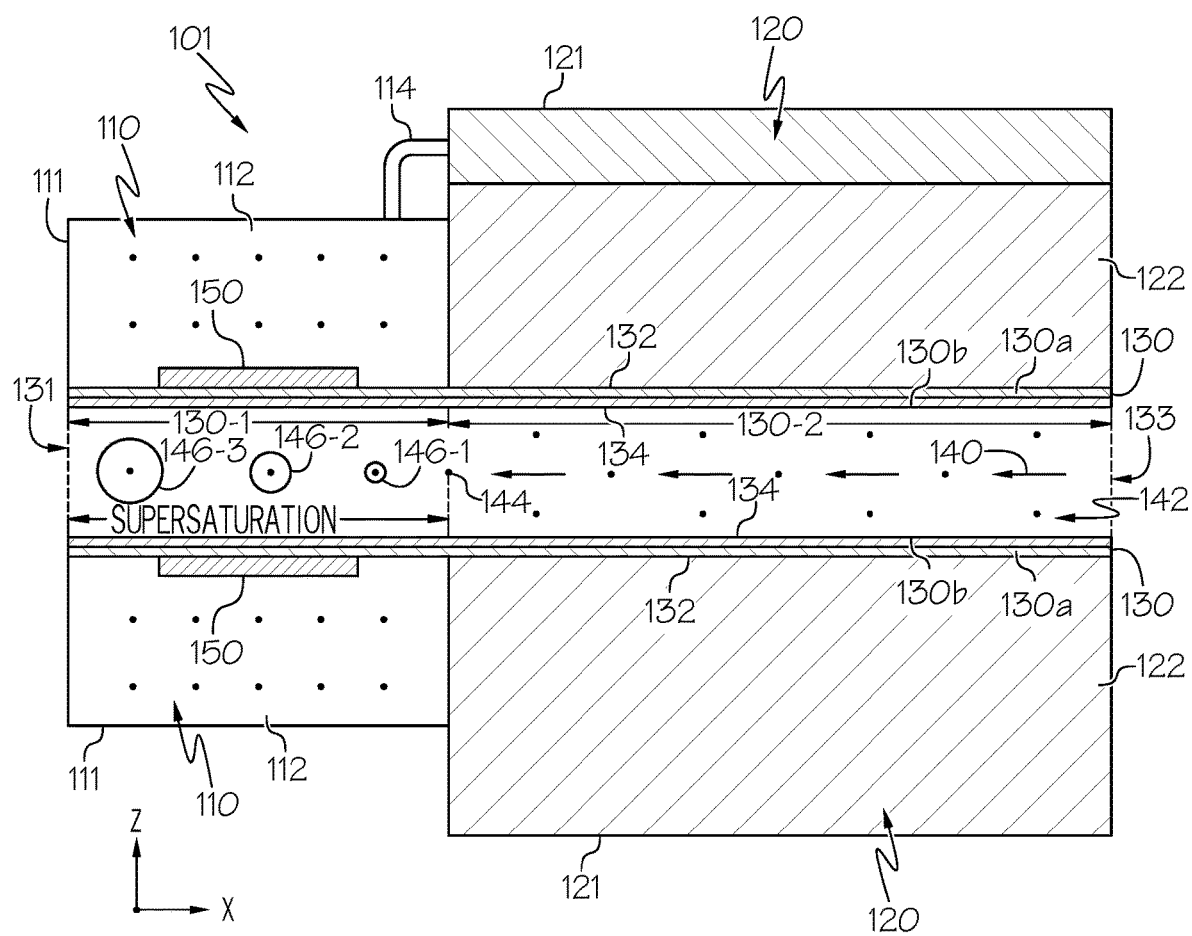
FIG. 2B depicts a cross sectional view of the droplet generator in FIG. 1A according to one or more embodiments illustrated and described herein.
Figure 3:
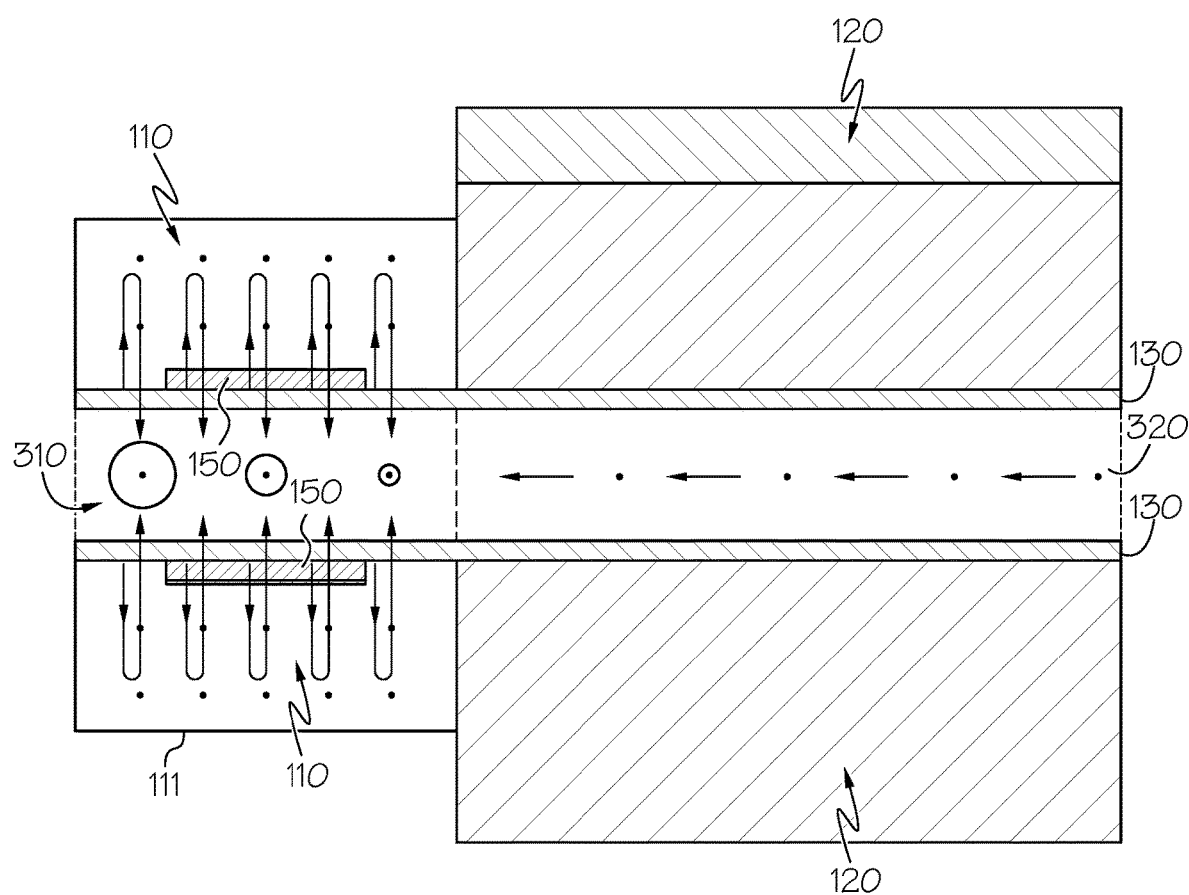
FIG. 3 depicts generation of droplets using super-saturation condition according to one or more embodiments shown and described herein.

As illustrated in FIGS. 2A and 2B, the tube 130 includes the first opening 133 at the side of the second chamber 120, and the second opening 131 at the side of the first chamber 110. The tube 130 includes a sidewall 136 having the outer surface 132 and an inner surface 134. The sidewall 136 may be of any suitable geometry, such as cylindrical or rectangular, for example, and may have a thickness between about 0.5 micrometers and 5 centimeters.

The tube 130 has various functions. First, the tube 130 provides a separation between the liquid 122 maintained within the second chamber 120 and a gas flow channel 142. Second, the tube 130 functions as a liquid flow channel that allows liquid from the second chamber 120 to move toward the side of first chamber 110 via the sidewall 136 by capillary action. For example, the liquid 122 in the second chamber 120 is absorbed by the second portion 130-2 of the tube 130, and the absorbed liquid flows to the first portion 130-1 of the tube 130. Third, the tube 130 provides vapor into the first chamber 110 when heated by the heater 150. For example, the liquid in the first portion 130-1 of the tube vaporize into the first chamber 110 when heated by the heater 150. Fourth, the tube 130 includes a plurality of pores that allow the vapor in the first chamber 110 to pass through the pores and flow into the gas flow channel 142 via diffusion and vapor pressure difference between the first chamber 110 and the gas flow channel 142.

As described in above with reference to FIGS. 1A and 1B, the liquid in the sidewall 136 at the first chamber 110 may be phase-changed into vapor by the heater 150 in the first chamber 110 and the vapor flows into the first chamber 110. The vapor in the first chamber 110 is then delivered toward the gas flow channel 142 via one or more paths through the pore structure of the sidewall of the tube 130. The one or more paths are generated as described above with reference to FIGS. 1B and 1C.

Referring to FIGS. 2A and 2B, the first opening 133 is configured to induce the particle-containing gas flow 140 into the gas flow channel 142 inside the tube 130. The particle-containing gas flow 140 may include any number of various particles including, but not limited to, diesel particles, microbes, chemical compounds, etc. The particle-containing gas flow 140 may also include volatile organic compounds, chemical gas, virus and bacteria, etc. The carrier of the particle-containing gas flow 140 may be a gas such as oxygen or nitrogen, for example. The particle-containing gas flow 140 may be continuously drawn into the first opening 133 by any means. As an example and not a limitation, the pump 190 in FIG. 1 may be utilized to draw particle-containing air into the first opening 133. As the particle-containing gas flow 140 traverses the gas flow channel 142 in −x direction, condensed droplets are formed upon the particles, for example, droplets 146-1, 146-2, and 146-3 which then exit the gas flow channel 142 at the second opening 131 on a continuous basis. The particles may be nanoscale particles and serve as seeds to become water droplets. The condensed droplets become bigger and gain weight as they move through the gas flow channel 142 because more vapor comes in contact with and condenses on the droplets as the droplets travel within a super-saturated area. In this regard, a nanoscale particle grows to microscale water droplet.

While the droplets grow and gain weight as they move through the gas flow channel 142, the droplets may also collect volatile organic compounds (VOCs) and/or other gaseous chemicals. The droplets serve as media to collect VOCs and/or other gaseous chemicals. VOCs and/or gaseous chemical near the surface of the water droplet (e.g., 146-1, 146-2, 146-3) spontaneously move to the surface by diffusion from a region of higher chemical concentration (e.g., a region outside the water droplets) to a region of lower concentration of the surface of water droplets. While the droplets grow, vapor generated from the first chamber 110 continuously condenses on the surface of droplets. Newly condensed vapor makes the concentration of droplet lower. Thus, the droplets continuously collect the VOC and gaseous chemical without saturation.

The second opening 131 can be connected with the nozzle 171 in FIG. 1. In some embodiments, the second opening 131 can be connected with an external sensing device (not shown) for analyzing generated droplets (e.g., a particulate filter, a particle collector, a particle counter, a particle analyzer, a chemical analyzer, a bio-marker analyzer, or a bio-species analyzer). The external sensing device may be in communication with an additional system or subsystem by wireless or wired communication. For example, the external sensing device may be communicably coupled to a remote computer by a wireless network such as a cellular network, a satellite communications network, a WiFi network and the like. Although not illustrated in the figures, embodiments described herein may also include a saturator/pre-conditioner section prior to the tube 130 by which the particle-containing gas flow 140 may be conditioned to a specified temperature and saturation ratio before entering the tube 130. For example, the temperature of the particle-containing gas flow 140 may be lowered by a cooling element prior to entering the first opening 133 of the tube 130.

In the embodiment illustrated in FIG. 2B, the first chamber 110 may be connected to the second chamber 120 via the bypass channel 114. The bypass channel 114 is operable to regulate the internal pressure of the first chamber 110. For example, if the pressure in the first chamber 110 is excessively greater than the pressure in the second chamber 120 (e.g., a difference between the pressure in the first chamber 110 and the pressure in the second chamber 120 is greater than a predetermined value), a port of the bypass channel 114 opens and allows the −vapor in the first chamber 110 to flow into the second chamber 120. Lowering pressure in the first chamber 110 and increasing pressure in the second chamber 120 may enhance capillary force that draws the liquid 122 in the tube 130 toward −x direction and help the liquid 122 flow in −x direction following the tube 130. Thus, the control of the pressure in the first chamber 110 may facilitate supply of vapor into the first chamber 110.

Figure 4A:
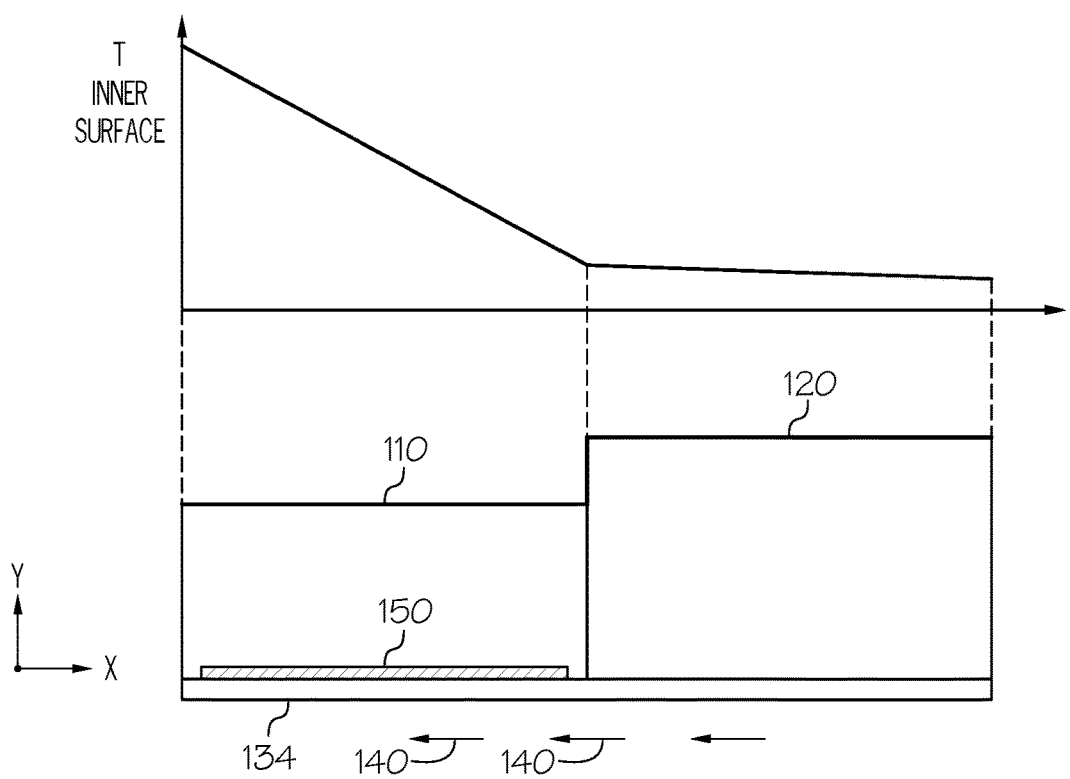
FIG. 4A illustrates the temperature of the inner surface of a tube along the direction of a particle-containing gas flow according to one or more embodiments shown and described herein.

The heater 150 may surround a portion of the outer surface 132 of the tube 130 in the first chamber 110. For example, the heater 150 may be a wire made of a heating element material that is wrapped around the outer surface 132 of the first portion 130-1. The heater 150 provides thermal energy for phase changing liquid contained in the tube 130 and produces a temperature gradient that is perpendicular to the direction of the particle-containing gas flow 140. For example, FIG. 4A illustrates the temperature of the inner surface 134 of the tube 130 along the direction of the particle-containing gas flow 140. The heater 150 may include a heating element that generates heat upon receiving a control electrical current or voltage.

Figure 4B:
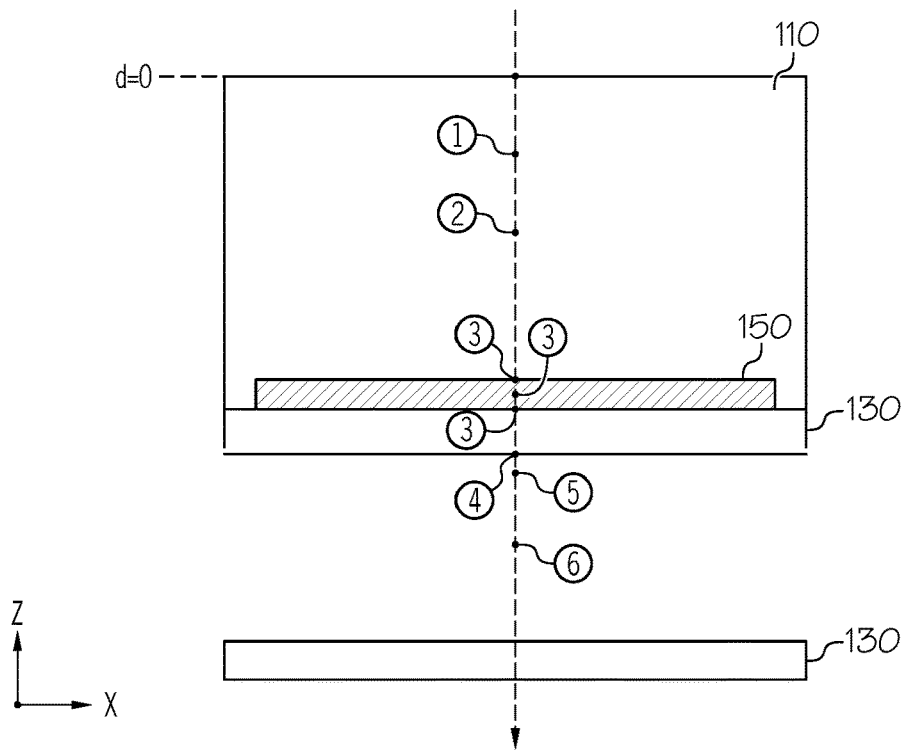
FIG. 4B illustrates temperature measuring points in a portion of the first chamber of the droplet generator, according to one or more embodiments shown and described herein.
Figure 4C:
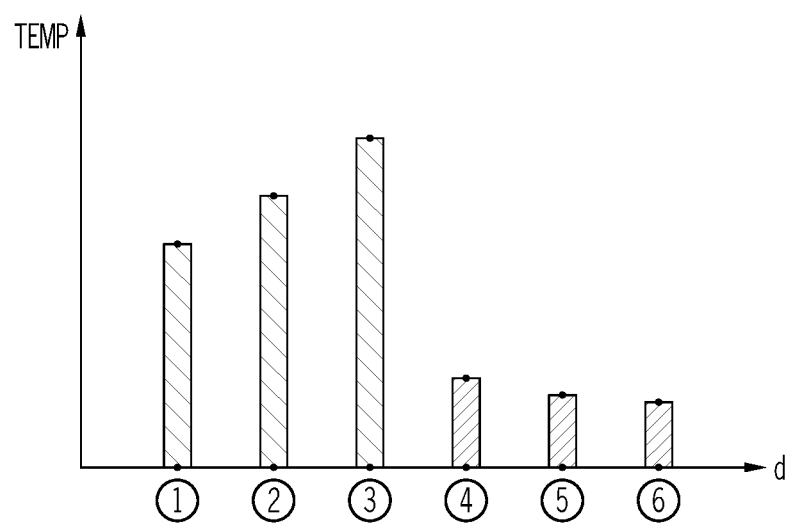
FIG. 4C illustrates a graph showing temperature distribution corresponding to the temperature measuring points in FIG. 4B.
Figure 5:
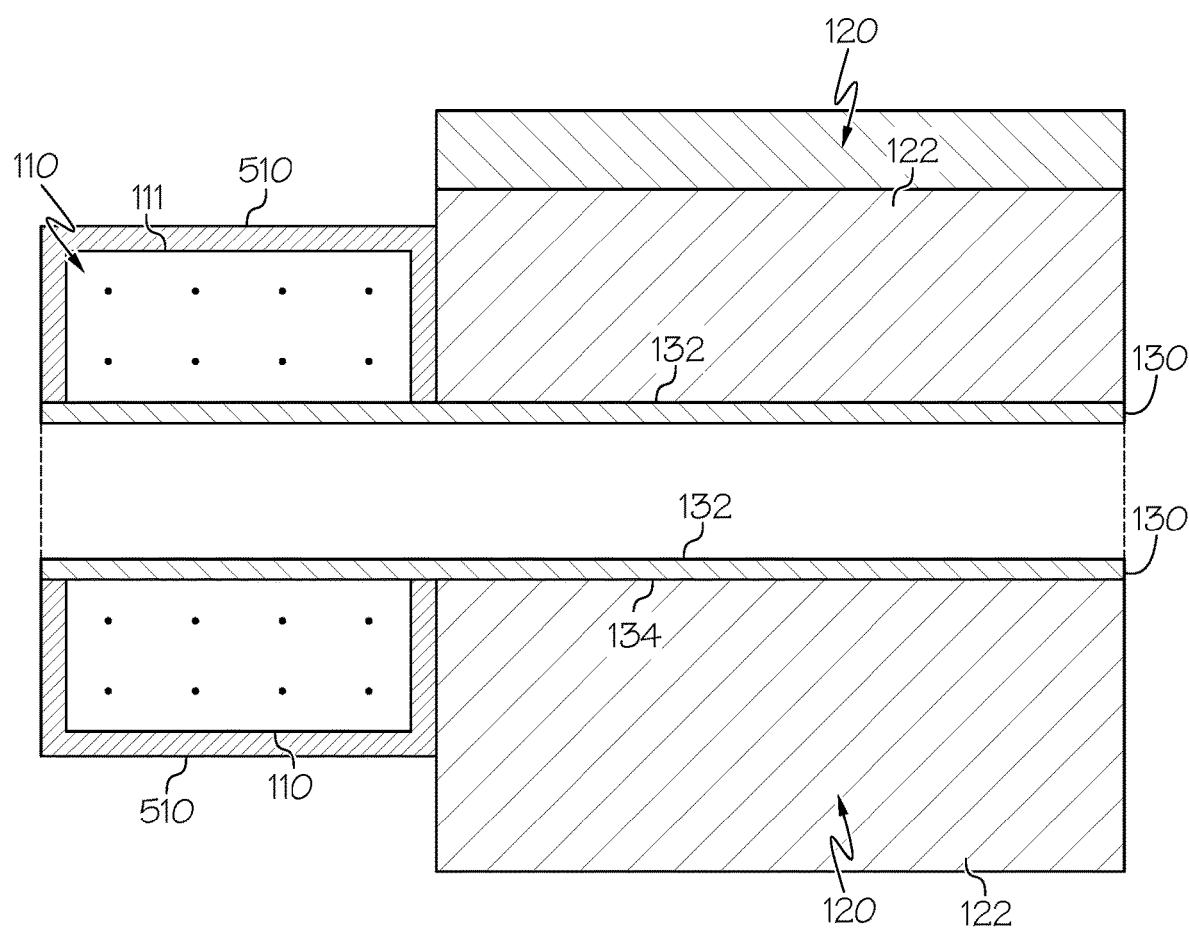
FIG. 5 depicts a cross sectional view of a droplet generator according to another embodiment illustrated and described herein.
Figure 6A:
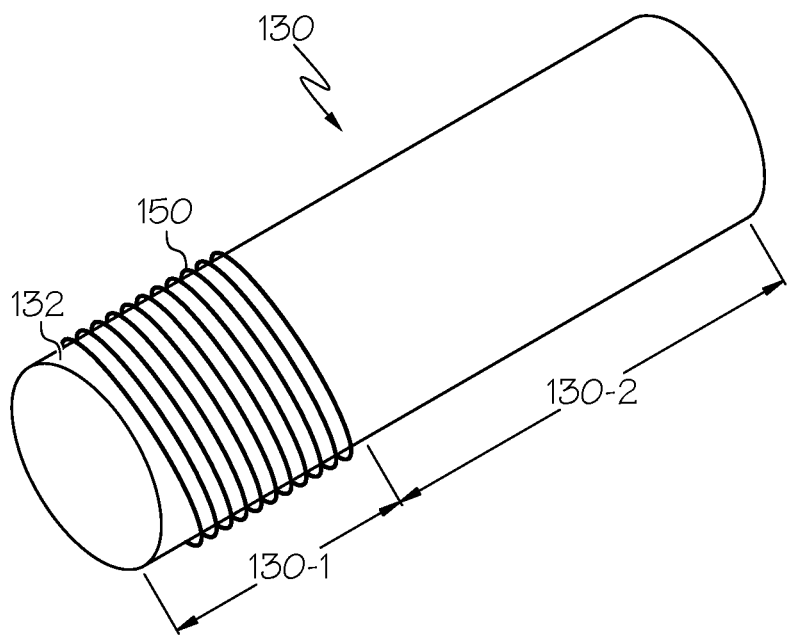
FIG. 6A depicts a schematic structure of a tube and a heater surrounding the tube according to one or more embodiments shown and described herein.
Figure 6B:
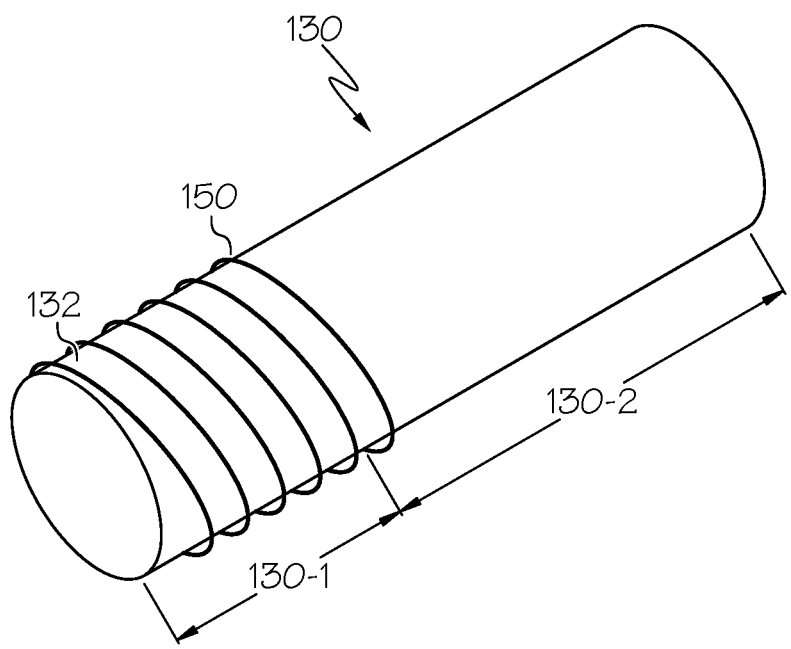
FIG. 6B depicts a schematic structure of a tube and a heater surrounding the tube according to another embodiment shown and described herein.
Figure 6C:
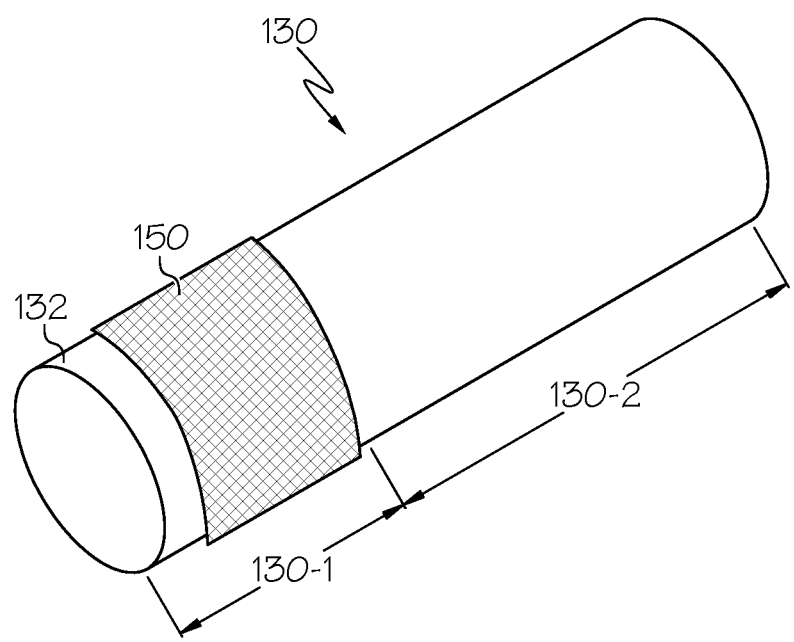
FIG. 6C depicts a schematic structure of a tube and a surface heater surrounding the tube according to another embodiment shown and described herein.
Figure 7:
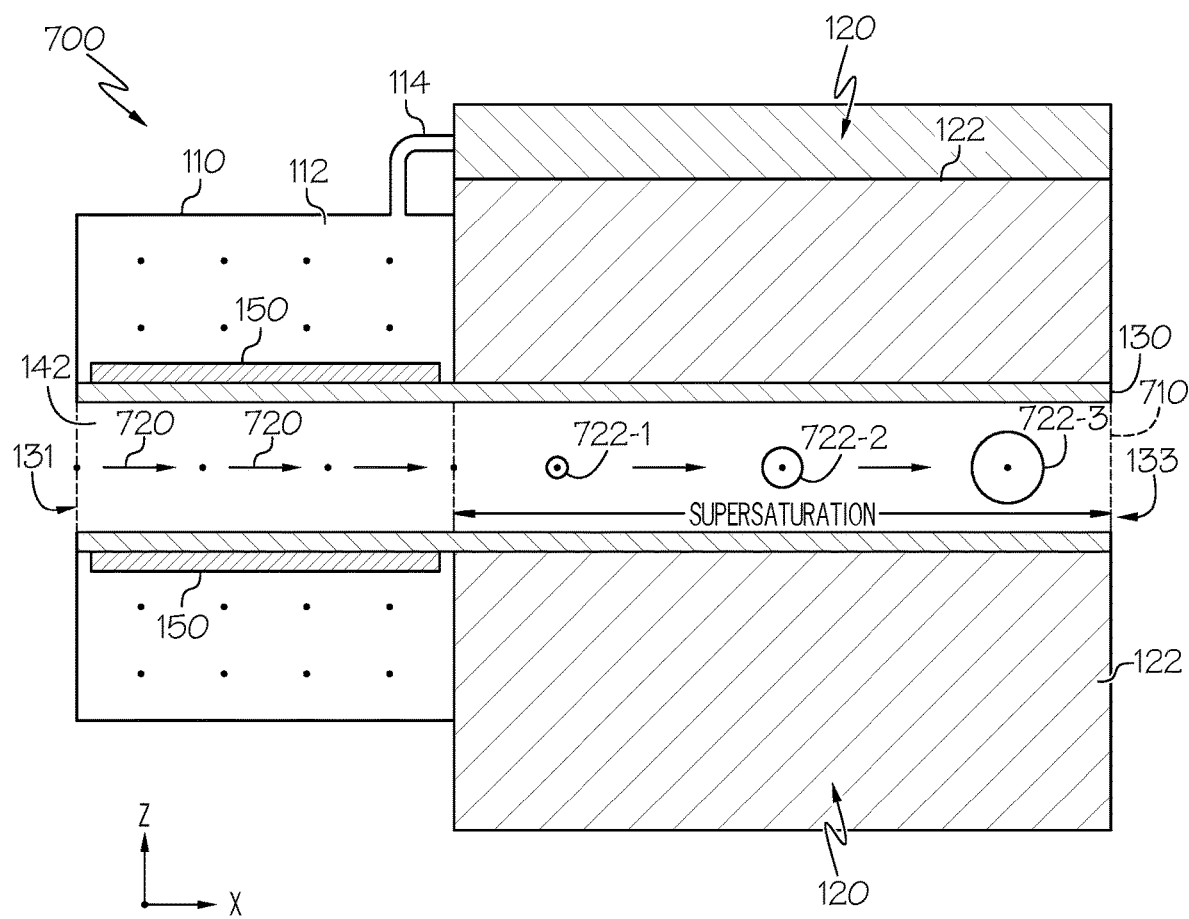
FIG. 7 illustrates the phase change of liquid contained in the tube and vapor driven into the gas flow channel by pressure, according to another embodiment shown and described herein.

FIG. 4B illustrates temperature measuring points in a portion of the first chamber of the droplet generator, according to one or more embodiments shown and described herein. FIG. 4C illustrates a graph showing temperature distribution corresponding to the temperature measuring points in FIG. 4B. As shown in FIG. 4C, the temperature at the point ③ (i.e., the heater body and contact surface with the outer surface 132 of the tube 130) is the highest and the temperature decreases as the temperature measurement point moves in +z direction. Similarly, the temperature may decrease as the temperature measurement point moves in −z direction from the point ③, and become lowest at the center of the gas flow channel 142 (i.e., at point ⑥). As shown in FIG. 4C, because the temperature of vapor in the first chamber 110 is relatively higher than the temperature of gas and/or particles in the gas flow channel 142, the vapor from the first chamber 110 may easily condense upon particles and droplets including particles in the gas flow channel 142. Additionally, as shown in FIG. 4C, the temperature at the point ③ (i.e., heater body and contact surface with the outer surface 132 of the tube 130) is higher than the temperature at the point ④ (i.e., the inner surface 134 of the tube 130). Thus, the vaporization of liquid in the tube 130 occurs at the outer surface 132 of the tube 130, and the vapor is supplied into the first chamber 110.

Although FIGS. 1A and 1B illustrate the heater 150 as surrounding the outer surface 132 of the tube 130, other configurations are also possible. In some embodiments, as illustrated in FIG. 5, the heater 510 may be configured to surround the first housing 111 of the first chamber 110. The heater 510 may surround an entire or portion of the first housing 111 of the first chamber. In this embodiment, the liquid in the first portion 130-1 of the tube 130 may be indirectly heated by the heater 510 and the liquid on the outer surface 132 of the tube 130 evaporates into the first chamber 110.

In some embodiments, the length of the heater 150 may be adjusted such that it provides heat to the entire length or a portion of the outer surface 132 of the tube 130 or the first housing 111 to provide optimal operating conditions. For example, as illustrated in FIG. 6A, the heating wire of heater 150 surrounds only the central portion of the first portion 130-1 of the tube 130. In this example, the heating wire may densely wrap around the outer surface 132 such that the central portion of the outer surface 132 of the first portion 130-1 is not substantially exposed to the first chamber 110 (not shown in FIG. 6A) whereas the rest of the outer surface 132 is exposed to the first chamber 110. The exposed outer surface 132 may include a plurality of pores and allow vapor in the first chamber 110 to flow into the gas flow channel 142 via the plurality of pores of the tube 130.

As another example, as illustrated in FIG. 6B, the heating wire of the heater 150 surrounds the entire of the first portion 130-1 of the tube 130. In this example, the heating wire may sparsely wrap around the outer surface 132 of the first portion 130-1 of the tube 130 such that outer surface 132 is exposed between wrapping wires. The exposed outer surface 132 between wrapping wires may include a plurality of pores and allow vapor in the first chamber 110 to flow into the gas flow channel 142 via the plurality of pores. As another example, as illustrated in FIG. 6C, a surface heater may surround a portion of the tube 130.

By still referring to FIG. 2B, in some embodiments, the tube 130 may include two layers of wall including an outer wall 130A and an inner wall 130B. The outer wall 130A may be a hydrophilic layer and the inner wall 130B may be a hydrophobic layer. The outer wall 130A functions similar to the sidewall 136 described above. For example, the outer wall 130A functions as a liquid channel that allows liquid from the second chamber 120 to move toward the side of first chamber 110 via the sidewall 136 by capillary action, and provides vapor into the first chamber 110 when heated by the heater 150. The outer wall 130A also includes a plurality of pores that allow the vapor in the first chamber 110 to pass through the pores and flow into the gas flow channel 142 via diffusion and/or vapor pressure difference between the first chamber 110 and the gas flow channel 142.

The inner wall 130B may be constructed from one or more hydrophobic layers that comprise nano- or microsize pore structures having a plurality of pores. The inner wall 130B which includes one or more hydrophobic layers prevents liquid from entering the gas flow channel 142 and disrupting the particle-containing gas flow 140. In wetting wall devices, liquid may enter the tube due to external forces such as shock or may only operate effectively in a vertical orientation. The inner wall 130B may include a plurality of pores that allow the vapor in the first chamber 110 to pass through the pores and flow into the gas flow channel 142 via diffusion and/or vapor pressure difference between the first chamber 110 and the gas flow channel 142. While the liquid in the outer wall is prevented from passing through the inner wall 130B because the inner wall 130B is a hydrophobic layer, the vapor in the first chamber 110 may pass through the plurality of pores of the inner wall 130B based on diffusion and/or vapor pressure difference between the first chamber 110 and the gas flow channel 142.

FIG. 3 depicts generation of droplets using super-saturation condition according to one or more embodiments shown and described herein. The operation and operational parameters of the continuous droplet generators will now be described. One issue regarding the design of a droplet generator may be the sustainability of supersaturated conditions inside the tube 130 that facilitate particle growth by condensation. The saturation ratio (or Supersaturation) may be defined by:

$$SR = \frac{p_v}{p_{sat}(T)}, \qquad \text{Equation (4)}$$

where, $p_v$ is partial pressure of vapor, $p_{sat}(T)$ is saturation pressure of vapor at temperature T. For water, the saturation ratio may be further defined by the ratio of the actual specific humidity to the specific humidity of saturated at the same temperature. If the resulting value is less than one, the condition is considered unsaturated. If the resulting value is equal to one, the condition is saturated. If the resulting value is greater than one, the condition is considered supersaturated. Supersaturation means that vapor exceedingly exists at a given temperature. Exposure of particles to supersaturated vapor results in vapor deposition in the form of absorption coupled with vapor condensation causing the droplets to grow about the particles.

The efficacy of the continuous droplet generator to nucleate particles depends upon the flow field and the thermal and mass transport inside evaporation-condensation tube. The rate of growth of droplets induced by a particle when the initial particle size is less than the mean gas free path is governed by the rate of random molecular collision of vapor molecules. The rate of collisions may be given by the kinetic theory of gases:

$$\frac{dD_p}{dt} = \frac{2M(p_v - p_d)}{\rho_p N_a \sqrt{2\pi mkT}} \text{ for } D_p < \lambda, \quad \text{Equation (5)}$$

where M is molecular weight of liquid, m is mass of a vapor molecule, $\lambda$ is particle-containing gas mean free path, $\rho_p$ is density of particle, t is time, k is gas constant per molecule, and $N_a$ is Avogadro's constant.

For particles larger than the gas mean free path, growth does not depend on the rate of random molecular collisions but rather on the rate of diffusion of molecules to the droplet surface. This is analogous to the coagulation of aerosol particles:

$$\frac{dD_p}{dt} = \frac{4Diff_v M(p_v - p_{sat})}{\rho_p D_p RT} \text{ for } D_p > \lambda, \quad \text{Equation 4}$$

By referring to FIG. 3, the area 310 within the tube 130 becomes supersaturated after the vapor in the first chamber 110 continuously flows into the gas flow channel of the tube 130 due to the pressure difference between the first chamber 110 and the area 310. Thus, when gas containing particles enter the area 310 which is supersaturated, vapor in the area 310 condenses on particles and on droplets containing particles.

FIG. 7 illustrates the phase change of liquid contained in the tube 130 and vapor driven into the gas flow channel by pressure, according to another embodiment shown and described herein.

The droplet generator 700 is the same as the droplet generator 101 shown in FIGS. 1A and 1B. In this embodiment, the liquid 122 contained in the second chamber 120 may be water or alcohol. As opposed to the embodiment shown in FIG. 1B where the particle-containing gas flow 140 flows into the gas flow channel 142 by entering the second opening 131, in this embodiment, the particle-containing gas flow 720 flows into the gas flow channel 142 by entering the first opening 133. The liquid 122 in the second chamber 120 is absorbed by the tube 130 and moves toward the first chamber 110. Then, the liquid in the tube 130 at the first chamber 110 may be phase-changed into vapor by the heater 150 and the vapor flows into the first chamber 110. The vapor in the first chamber 110 is then delivered toward the gas flow channel 142 via the pores of the tube 130 because the vapor pressure in the first chamber 110 is higher than the vapor pressure in the gas flow channel 142, as described above.

As the particle-containing gas flow 140 traverses the gas flow channel 142 in +x direction, condensed droplets are formed upon the particles, for example, droplets 722-1, 722-2, and 722-3 which then exit the gas flow channel 142 at the first opening 133 on a continuous basis. As opposed to the super-saturation area 310 in FIG. 3, in this embodiment, an area 710 in FIG. 7 becomes supersaturated because of the characteristics of alcohol. In this embodiment, the temperature of the gas containing particles decreases as the gas travels in +x direction, and vaporized alcohol may condense upon particles and droplets including particles in the gas flow channel 142 while the vaporized alcohol travels through the area 170.

FIG. 8 depicts a droplet generator 800 including a plurality of tubes, according to another embodiment shown and described herein.

The illustrated embodiment generally comprises a first chamber 810, a second chamber 820, a plurality of tubes 830, and a plurality of heaters 850. As shown in FIG. 8, the each of the plurality of tubes 830 extends through the first chamber 810 and the second chamber 820 along the x-axis. Each of the plurality of tubes 830 includes a first opening 833 at the side of the second chamber 820 and a second opening 831 at the side of the first chamber 810. Each of the plurality of heaters 850 is within the first chamber 810 and surrounds a portion of the outer surface of each of the plurality of tubes 830. The first chamber 810 may be connected to the second chamber 820 via a bypass channel 814. In some embodiments, the droplet generator 101 may not include the bypass channel 814.

The second chamber 820 is configured to maintain liquid 822, which may be water, any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The liquid 822 may be absorbed by the plurality of tubes 830 in the second chamber 820 and the absorbed liquid may move in −x direction (i.e., toward the first chamber 810). Each of the plurality of heaters 850 in the first chamber 810 changes a phase of the liquid contained in each of the plurality of tubes 830 to vapor such that the vapor is provided into the first chamber 810.

The first chamber 810 includes an enclosed space 812. The enclosed space 812 is bounded by the first housing 811 and the plurality of the tubes 830. Specifically, the enclosed space 812 is bounded by the first housing 811 and the outer surfaces of the plurality of tubes 830. That is, the first chamber 810 is a cylindrical chamber and the plurality of tubes 830 pass through the first chamber 810. The second chamber 820 is bounded by the second housing 821 and the plurality of tubes 830. Specifically, the second chamber 820 is bounded by the second housing 821 and the outer surfaces of the plurality of tubes 830. That is, the second chamber 820 is a cylindrical chamber and the plurality of tubes 830 pass through the second chamber 820.

The first chamber 810 and the second chamber 820 are separated from each other such that the liquid 822 in the second chamber 820 does not flow into the first chamber 810 except via the plurality of tubes 830. The second housing 821 may include a liquid inlet (not shown) to fill the second chamber 820 with the liquid 822.

Each of the tubes 830 may have the similar structure as the tube 130 described above. For example, each of the tubes 830 includes a sidewall having an outer surface and an inner surface. The sidewall may be of any suitable geometry, such as cylindrical or rectangular, for example, and may have a thickness between about 0.5 micrometers and 5 centimeters. Each of the tubes 830 has various functions. First, the tube 830 provides a separation between the liquid 822 maintained within the second chamber 820 and a gas flow channel inside each of the plurality of tubes 830. Second, the tube 830 functions as a liquid channel that allows liquid from the second chamber 820 to move toward the side of the first chamber 810 via the side wall of the tube 830 by capillary action. Third, the tube 830 provides vapor into the enclosed space 812 of the first chamber 810 when heated by the heater 850. Fourth, the tube 830 includes a plurality of pores that allow the vapor in the enclosed space 812 of the first chamber 810 to pass through the pores and flow into the gas flow channel within each of the tubes 830 via diffusion and/or vapor pressure difference between the first chamber 810 and the gas flow channel.

Figure 8:
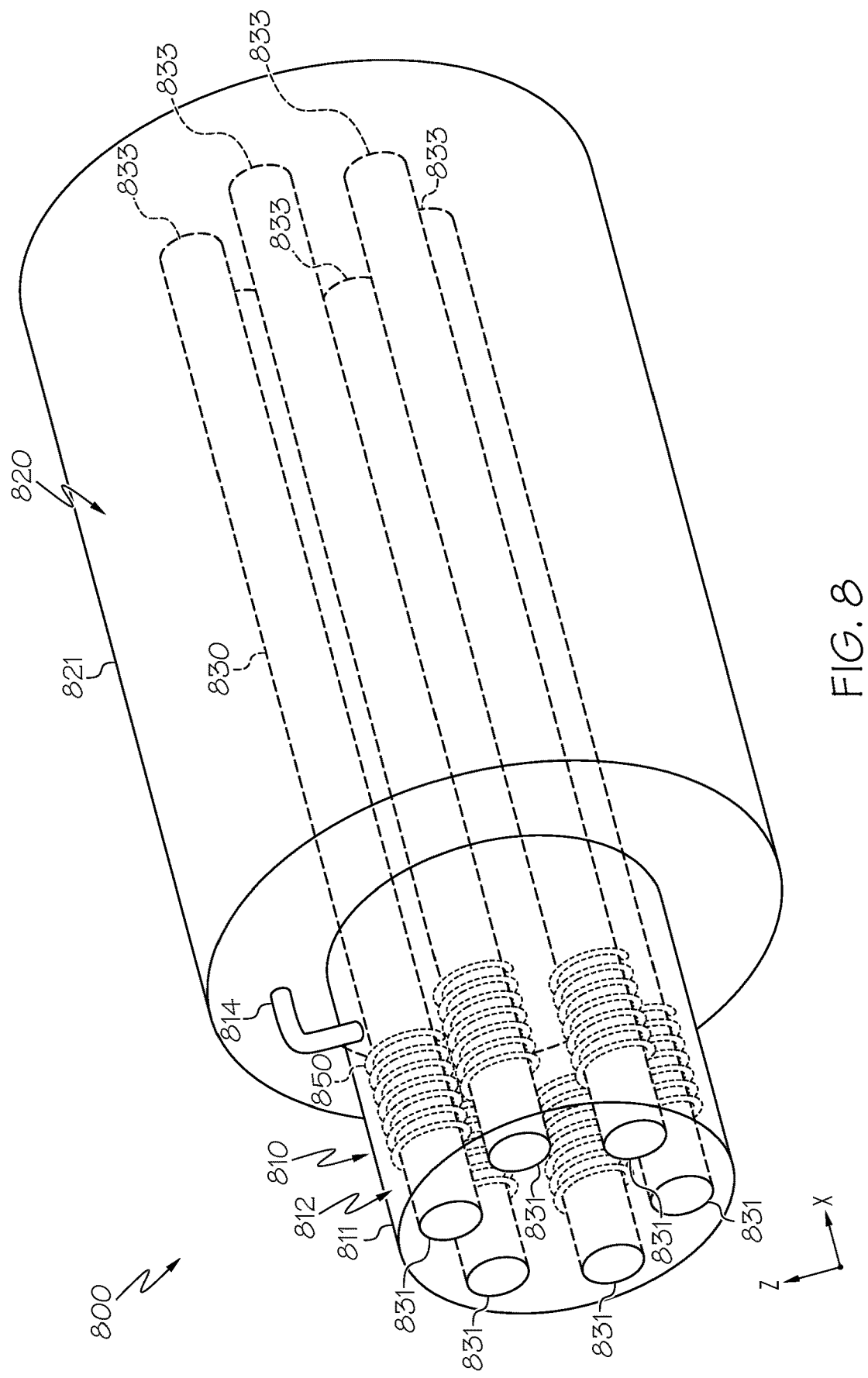
FIG. 8 depicts a droplet generator including a plurality of tubes, according to another embodiment shown and described herein.
Figure 8A:
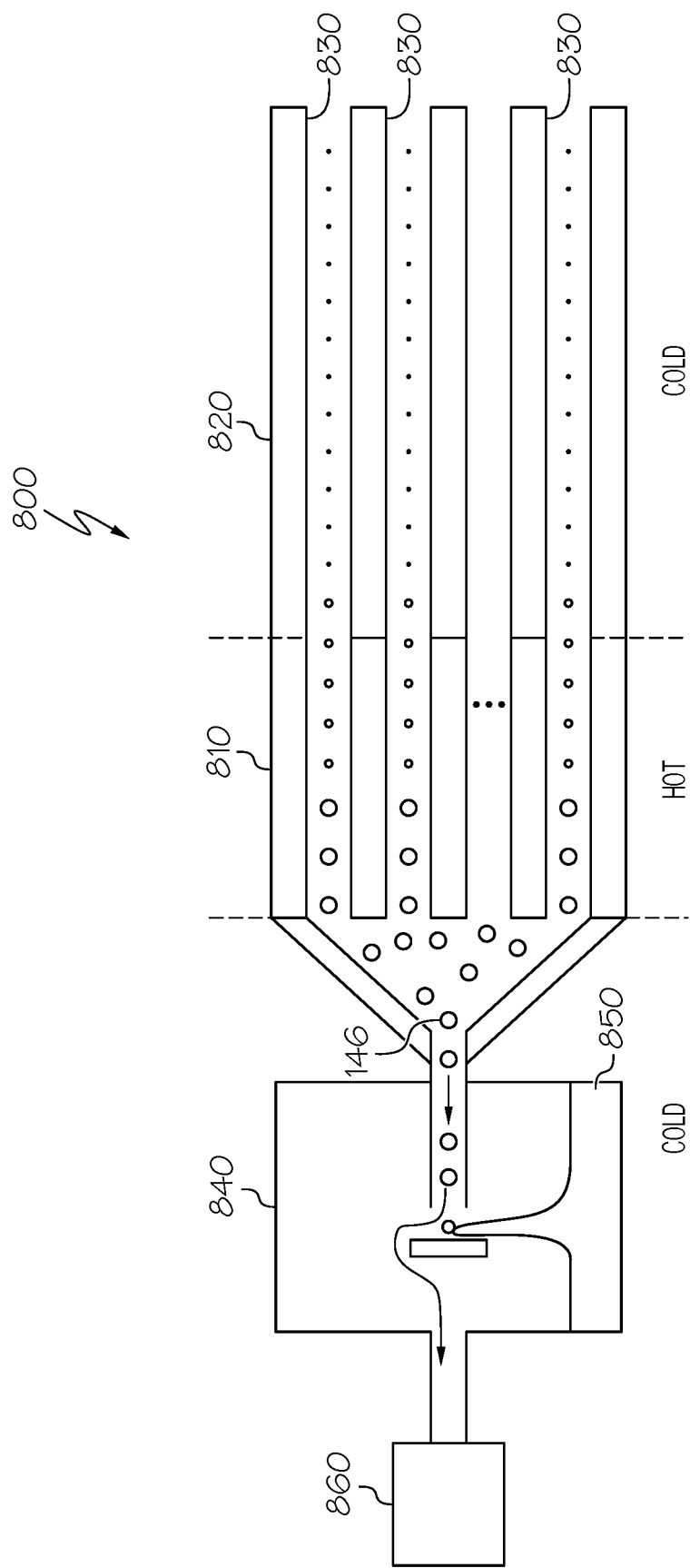
FIG. 8A depicts a system for collecting particles or gaseous chemicals using the droplet generator 800 in FIG. 8 according to another embodiment shown and described herein.

FIG. 8A depicts a system for collecting particles or gaseous chemicals using the droplet generator 800 in FIG. 8 according to another embodiment shown and described herein. Similar to FIG. 1, a nozzle may be connected between the outlet of the droplet generator 800 and the inlet of the collecting device 840. The outlet of the collecting device 840 is connected to a pump 860. Because the droplet generator 800 includes multiple tubes 830, the amount of droplets collected per time may be increased.

Figure 9:
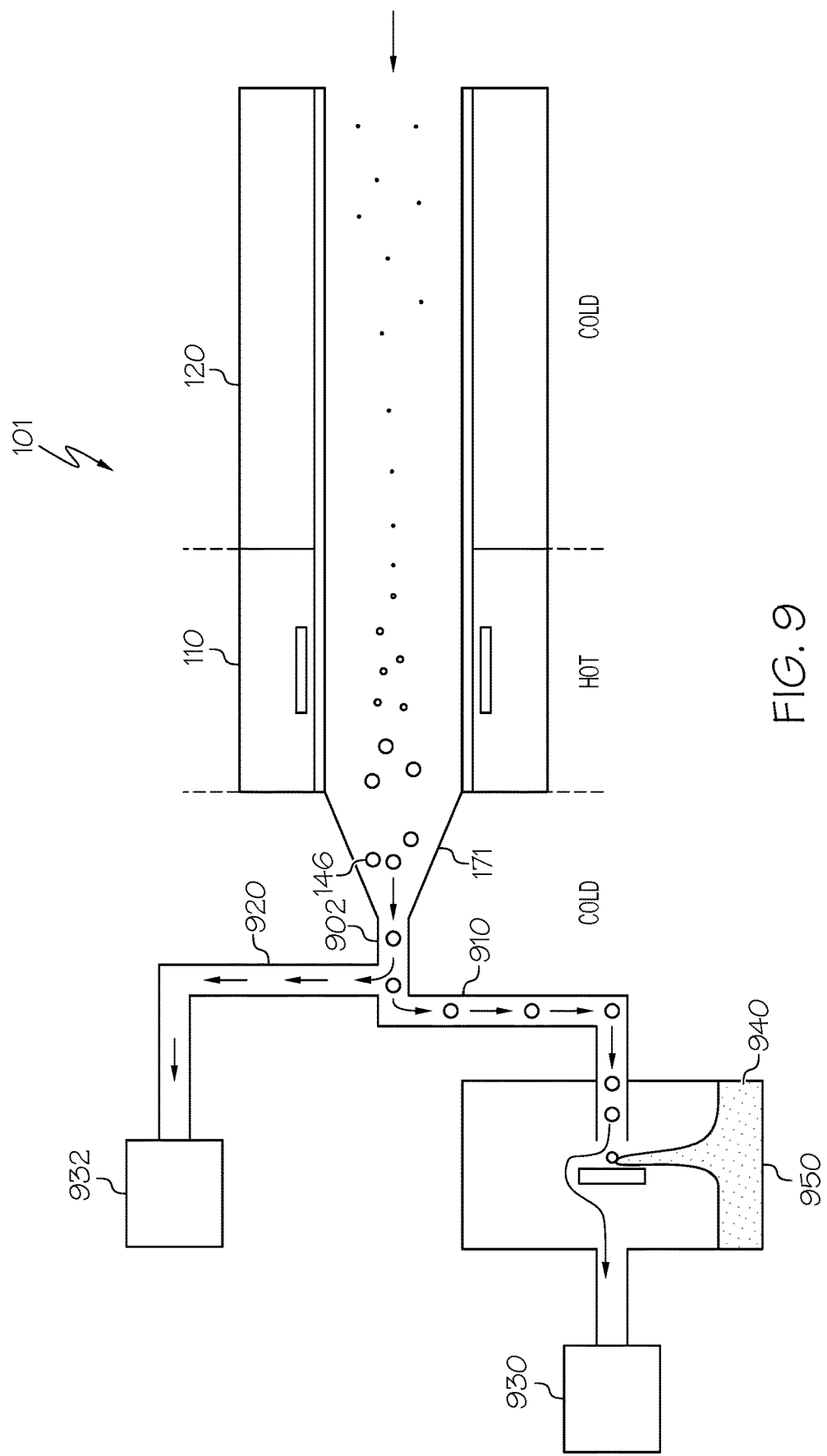
FIG. 9 depicts a system for collecting particles or gaseous chemicals according to another embodiment shown and described herein.

FIG. 9 depicts a system for collecting particles or gaseous chemicals according to another embodiment shown and described herein. The outlet of the droplet generator 101 is connected to the nozzle 171 which is connected to a tube 902 which bifurcates to a first channel 910 and a second channel 920. Each of the first channel 910 and the second channel 920 may a tube similar to the tube 902. The flow rate in the second channel 920 may be greater than the flow rate in the first channel 910. The flow rate in the tube 902 is the sum of the flow rate in the first channel 910 and the flow rate in the second channel 920. The first channel 910 is connected to a collecting device 950 which is similar the collecting device 180 in FIG. 1. The collecting device 950 is connected to a first pump 930. The second channel 920 is connected to a second pump 932. Both the first pump 930 and the second pump 932 draw gas from the droplet generator 101.

Most or all of the droplets 146 in the tube 902 pass through the first channel 910 because of the inertia of the droplets 146 and the flow rate difference between the first channel 910 and the second channel 920. Thus, the amount of the droplets 146 per volume in the first channel 910 is relatively high. For example, the amount of the droplets 146 per volume in the first channel 910 is greater than the amount of the droplets 146 per volume in the tube 183 in FIG. 1. In addition, the amount of vapor per volume in the first channel 910 is relatively low because a portion of vapors in the tube 902 are transferred to the second channel 920. For example, the amount of vapor per volume in the first channel 910 is lower than the amount of vapor per volume in the tube 183 in FIG. 1. In this regard, the concentration of particles and/or gaseous chemicals in the liquid 940 increases compared to the one in the liquid 148 in FIG. 1 because less vapors are provided to the collecting device 950 from the droplet generator 101.

Figure 10:
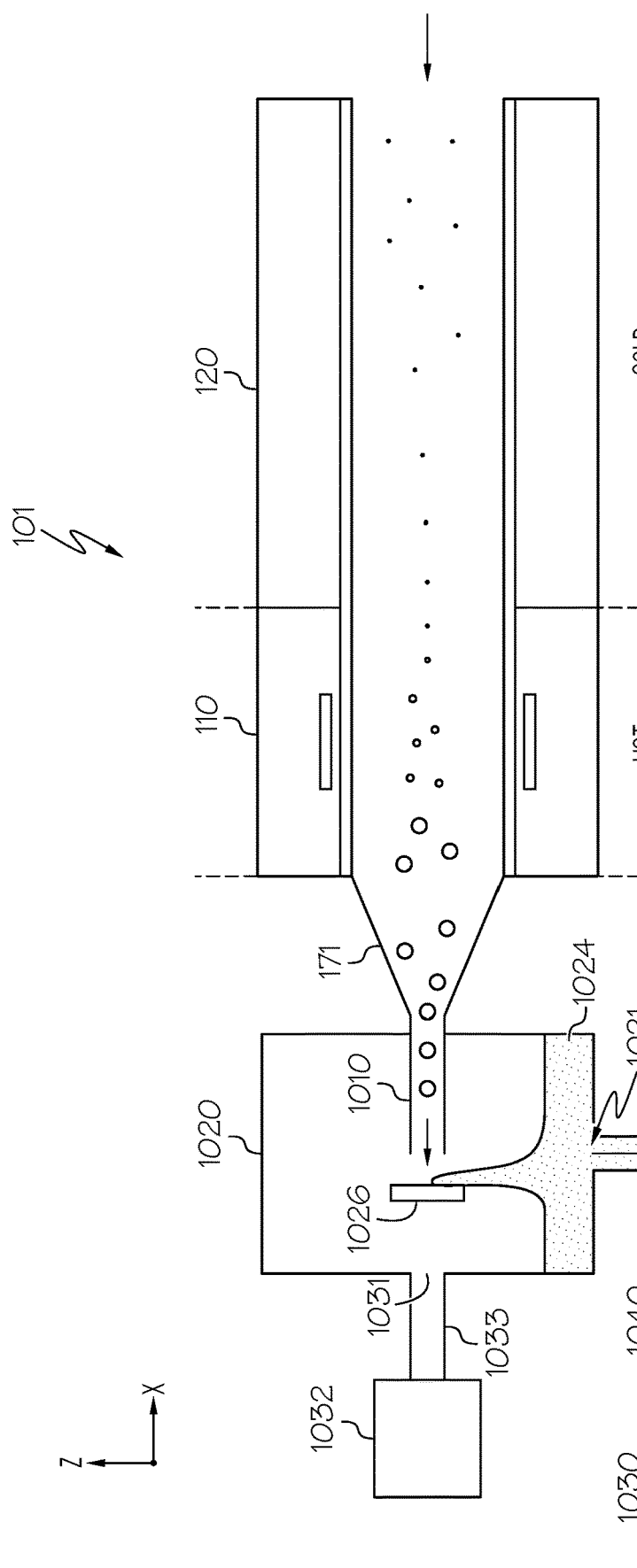
FIG. 10 depicts a system for collecting particles or gaseous chemicals according to another embodiment shown and described herein.

FIG. 10 depicts a system for collecting particles or gaseous chemicals according to another embodiment shown and described herein. The outlet of the droplet generator 101 is connected to the nozzle 171 which is connected to a tube 1010. The tube 1010 is inserted into an inlet of a collecting device 1020. The first outlet 1021 of the collecting device 1020 is connected to a first channel 1022 such that the liquid 1024 collected as a result of the droplets 146 hitting the wall 1026 may flow into the first channel 1022. The first channel 1022 includes a filter 1040. The filter 1040 is configured to collect particles in the liquid 1024. The first channel 1022 is connected to a first pump 1030 which is configured to draw liquid from the collecting device 1020. The second outlet 1031 of the collecting device 1020 is connected to a second channel 1033 which is connected to a second pump 1032. The second pump 1032 is configured to draw gas from the collecting device 1020. The flow rate in the tube 1010 is the sum of the flow rate in the second channel 1033 and the flow rate in the first channel 1022. Because the collecting device 1020 transfers the liquid to the first channel 1022 in real time, the liquid 1024 may include less liquid that is condensed from vapors in the collecting device 1020.

Figure 11:
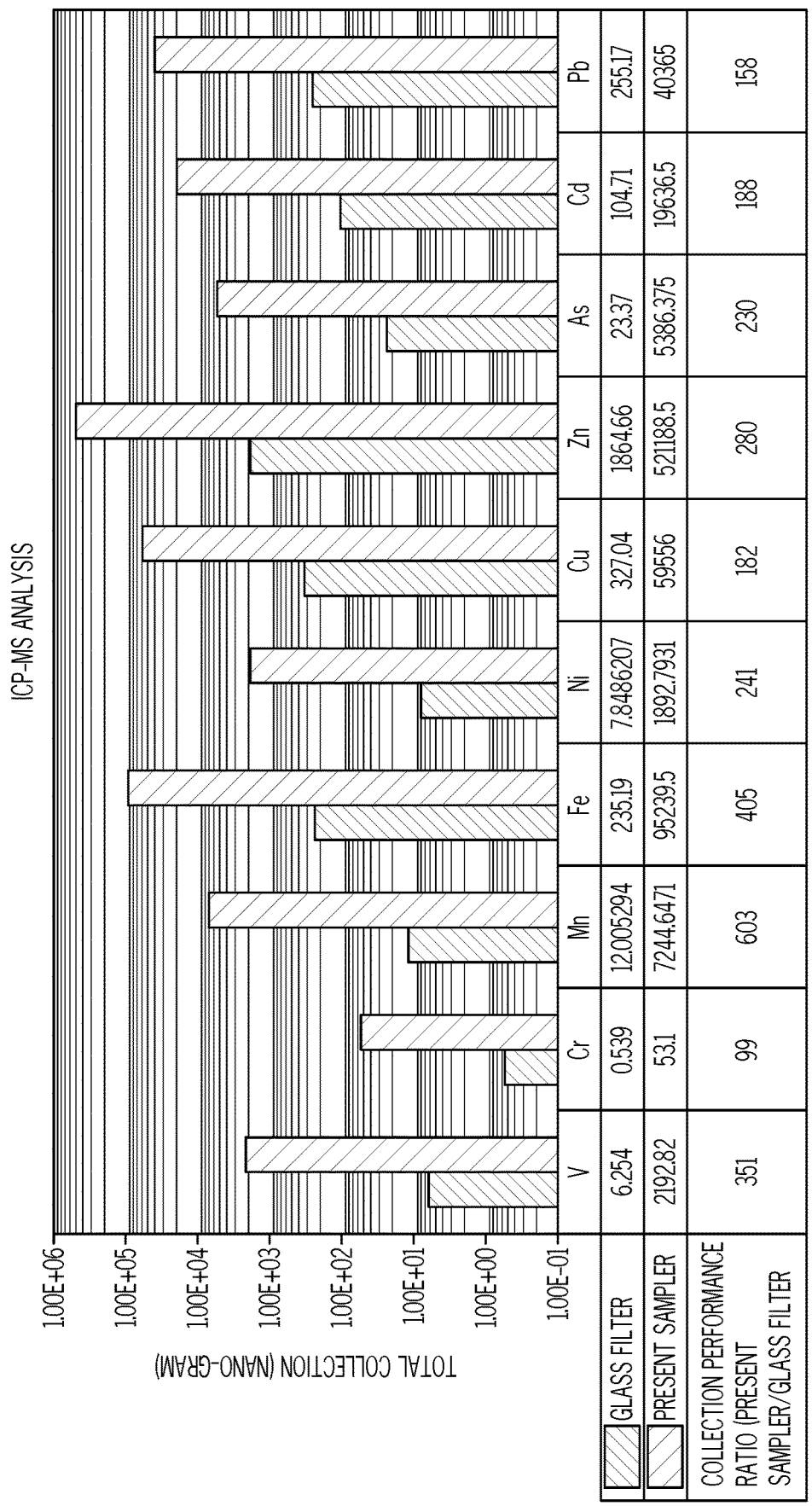
FIG. 11 depicts a inductively coupled plasma mass spectrometry (ICP-MS) analysis for particles collected by a conventional glass filter and particles collected by the present sampler.

FIG. 11 depicts a inductively coupled plasma mass spectrometry (ICP-MS) analysis for particles collected by a conventional glass filter and particles collected by the present sampler (e.g., the system 100 in FIG. 1). The graph illustrates the total collection of each of particles by the conventional glass filter and the present sampler. The conventional glass filter has 220-nanometer pores and has a 5 centimeter length. By referring to FIG. 11, the conventional glass filter collected 6.254 nano-grams of Vanadium (V) whereas the present sampler collected 2192.82 nano-grams of Vanadium (V) under the same condition. The collection performance ratio of the present sampler to the conventional glass filter is about 351. The present sampler has much higher collection performance than the conventional glass filter for other particles as well. For example, the conventional glass filter collected 12.00529 nano-grams of Manganese (Mn) whereas the present sampler collected 7244.647 nano-grams of Manganese (Mn). The collection performance ratio of the present sampler to the conventional glass filter is about 603.

Figure 12B:
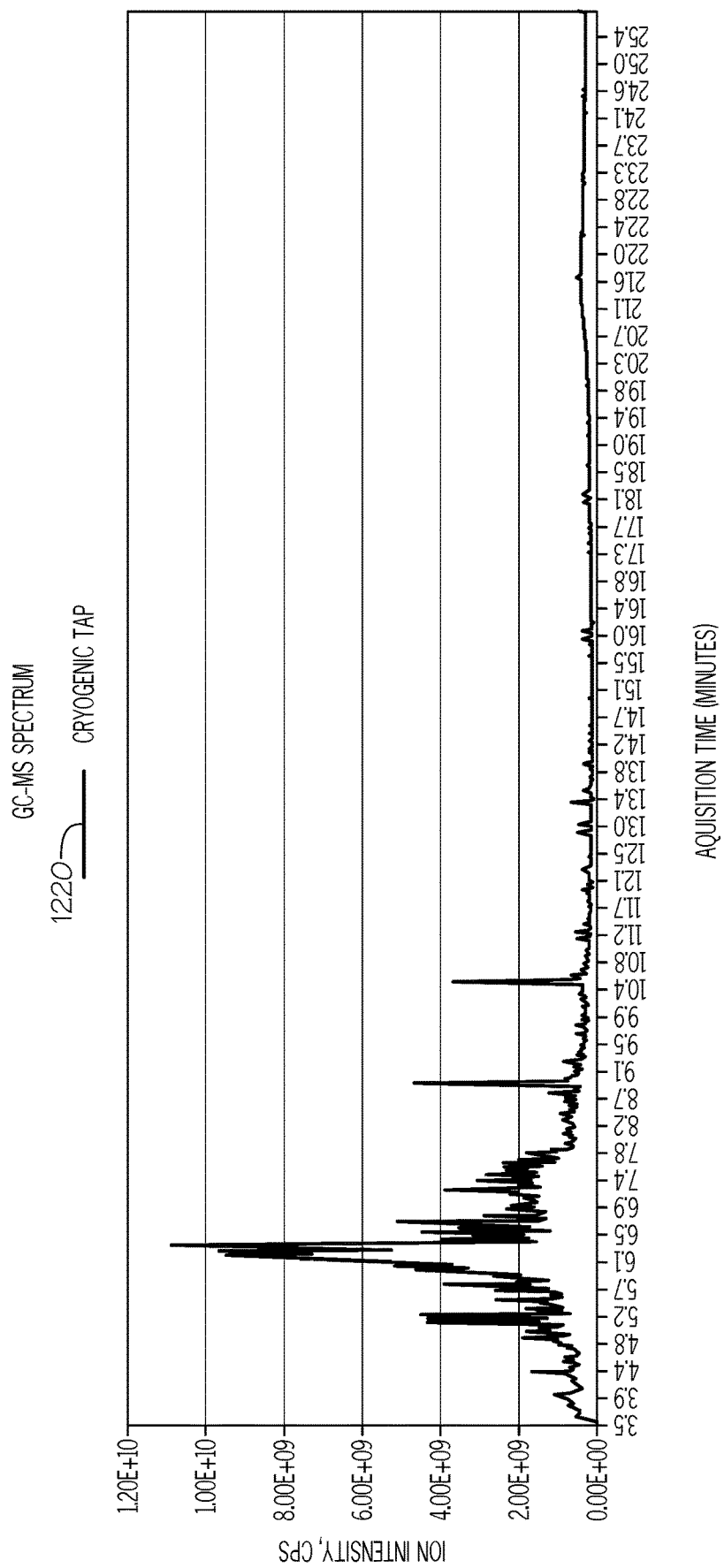
FIG. 12B depicts an enlarged GC-MS spectrum of the graph in FIG. 12A2.

FIG. 12A1 depicts a Gas chromatography-mass spectrometry (GC-MS) spectrum illustrating ion intensity in counts per second (CPS) over time in minutes for particles collected by the present sampler. FIG. 12A2 depicts a GC-MS spectrum illustrating ion intensity in CPS over time in minutes for particles collected by a conventional cryogenic trap. As illustrated in FIGS. 12A1 and 12A2, the ion intensity of the present sampler is significantly higher than the ion intensity of the conventional trap. FIG. 12B depicts an enlarged GC-MS spectrum of the graph in FIG. 12A2 by changing scales of y-axis. As illustrated in FIGS. 12A1 and 12B, the peaks in the GC-MS spectrum in FIG. 12A1 are almost identical to the peaks in the GC-MS spectrum in FIG. 12B. However, the ion intensity of the particles collected by the present sampler is about 10 times greater than the ion intensity of the particles collected by the conventional cryogenic trap. That is, the present sampler collects the same particles as the conventional cryogenic trap with greater performance ratio.

It should now be understood that embodiments of the present disclosure are direct to collecting particles and/or gaseous chemicals by droplets with a significantly increased collecting performance. The method includes providing liquid to a tube of the droplet generator, heating, with a heater of the droplet generator, the tube to provide vapor to a gas flow channel inside the tube, passing a gas flow containing the particles or gaseous chemicals through the gas flow channel inside the tube to obtain droplets including the particles or gaseous chemicals, and passing the droplets including the particles or gaseous chemicals to a wall of a collecting device such that the droplets including the particles or gaseous chemicals hit the wall. A temperature inside the gas flow channel is higher than a temperature inside the collecting device. The gas flow containing the particles or gaseous chemicals is passed through the gas flow channel inside the tube by a pump, and the droplets including the particles or gaseous chemicals is passed to a wall of a collecting device by the pump. The droplets hit the wall because of inertia and accumulate in the collecting device.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for collecting particles or gaseous chemicals, the method comprising:
   providing liquid to a tube of a droplet generator;
   heating, with a heater of the droplet generator, the tube to provide vapor to a gas flow channel inside the tube;
   passing a gas flow containing the particles or gaseous chemicals through the gas flow channel inside the tube to obtain droplets including the particles or gaseous chemicals; and
   passing the droplets including the particles or gaseous chemicals, through another tube connected between a nozzle of the droplet generator and a collecting device, to a wall of the collecting device such that the droplets including the particles or gaseous chemicals hit the wall,
   wherein a temperature inside the gas flow channel is higher than a temperature inside the collecting device,
   wherein the collecting device is a cylindrical chamber and the wall is a side wall of the cylindrical chamber, and
   wherein the another tube is bended such that the droplets including the particles or gaseous chemicals hit an inner wall of the another tube when the droplets pass through the another tube.

2. The method of claim 1, wherein the gas flow containing the particles or gaseous chemicals is passed through the gas flow channel inside the tube by a pump; and
   the droplets including the particles or gaseous chemicals is passed to the wall of the collecting device by the pump.

3. The method of claim 1, further comprising
   heating, with the heater of the droplet generator, the tube to provide vapor to the gas flow channel inside the tube to make the gas flow channel super-saturated.

4. The method of claim 1, wherein a velocity of the droplets including the particles or gaseous chemicals increase while passing through the nozzle before hitting the wall.

5. The method of claim 1, further comprising:
   collecting the droplets including the particles or gaseous chemicals in a storage of the collecting device.

6. The method of claim 1, further comprising:
   passing, by a first pump, the droplets including the particles or gaseous chemicals to a first channel connected to the droplet generator; and
   passing, by a second pump, a gas flow to a second channel connected to the droplet generator,
   wherein a flow rate in the second channel is greater than a flow rate in the first channel.

7. The method of claim 1, further comprising:
   collecting the droplets including the particles or gaseous chemicals in a storage of the collecting device; and
   pumping, by a liquid pump, the collected droplets to a filter.

8. The method of claim 1, wherein the liquid comprises water, an organic compound in which a hydroxyl group (—OH) is bound to a carbon atom of an alkyl or substituted alkyl group, or combinations thereof.

9. The method of claim 1, wherein the tube comprises a hydrophilic layer configured to contain the liquid.

10. The method of claim 9, wherein the tube further comprises a hydrophobic layer.

11. A system for collecting particles or gaseous chemicals, the system comprising:
    a pump;
    a droplet generator comprising:
      a chamber;
      a tube containing liquid and extending through the chamber;
      a gas flow channel inside the tube; and
      a heater configured to heat the liquid contained in the tube to provide vapor to a gas flow channel inside the tube;
    a collecting device comprising a wall; and
    another tube connected between a nozzle of the droplet generator and the collecting device,
    wherein the pump is configured to:
    pass a gas flow containing particles or gaseous chemicals through the gas flow channel inside the tube to obtain droplets including the particles or gaseous chemicals; and
    pass the droplets including the particles or gaseous chemicals to the wall of the collecting device such that the generated droplets including the particles or gaseous chemicals hit the wall,
    wherein the collecting device is a cylindrical chamber and the wall is a side wall of the cylindrical chamber, and
    wherein the another tube is bended such that the droplets including the particles or gaseous chemicals hit an inner wall of the another tube when the droplets pass through the another tube.

12. The system of claim 11, wherein the gas flow channel is in a super-saturated condition.

13. The system of claim 11, further comprising:
    a first channel connected to the droplet generator and connected to the pump;
    a second pump; and
    a second channel connected to the droplet generator and connected the second pump,
    wherein the second pump is configured to pass a gas flow to the second channel connected to the droplet generator, and
    a flow rate in the second channel is greater than a flow rate in the first channel.

14. The system of claim 11, wherein the collecting device comprises a storage configured to store the droplets including the particles or gaseous chemicals.

15. The system of claim 11, further comprising:
    a storage located under the wall and configured to collect the droplets including the particles or gaseous chemicals; and
    a pump configured to pump the collected droplets to a filter.

16. The system of claim 15, further comprising:
    a filter feeder configured to feed the filter;
    a drier configured to dry the filter having the collected droplets; and
    a real-time analyzer configured to capture and analyze dried filter.

17. The system of claim 11, wherein the liquid comprises water, an organic compound in which a hydroxyl group (—OH) is bound to a carbon atom of an alkyl or substituted alkyl group, or combinations thereof.

18. The system of claim 11, wherein:
    the tube comprises a hydrophilic layer configured to contain the liquid; and
    the tube further comprises a hydrophobic layer.

19. The system of claim 11, wherein the droplet generator comprises:
- a plurality of tubes each containing liquid and extending through the chamber;
- a plurality of gas flow channels inside the plurality of tubes; and
- a plurality of heaters configured to heat the liquid contained in the plurality of tubes to provide vapor to the plurality of gas flow channels inside the plurality of tubes.

* * * * *